United States Patent
Turrini et al.

(10) Patent No.: US 7,523,678 B2
(45) Date of Patent: Apr. 28, 2009

(54) METHOD FOR DETECTING AND QUANTIFYING DRILLING ANOMALIES

(75) Inventors: Claude Roger Robert Turrini, Ballancourt (FR); Veronique Jeannine Suzanne Zerrouki, Mennecy (FR); Christophe Colin, Evry (FR); Geraldine Laure Perrin, Paris (FR)

(73) Assignees: SNECMA, Paris (FR); ARMINES, Paris (FR)

( * ) Notice: Subject to any disclaimer, the term of this patent is extended or adjusted under 35 U.S.C. 154(b) by 0 days.

(21) Appl. No.: 11/829,627

(22) Filed: Jul. 27, 2007

(65) Prior Publication Data

US 2008/0047333 A1   Feb. 28, 2008

(30) Foreign Application Priority Data

Jul. 28, 2006   (FR) ................. 06 53162

(51) Int. Cl.
  *G01L 3/00* (2006.01)
(52) U.S. Cl. ...................... 73/862.08; 702/9
(58) Field of Classification Search . 73/862.08–862.69; 702/9
See application file for complete search history.

(56) References Cited

U.S. PATENT DOCUMENTS

| 4,695,957 | A |   | 9/1987 | Peltier |
| 5,275,040 | A | * | 1/1994 | Codazzi ............... 73/152.22 |
| 5,473,158 | A | * | 12/1995 | Holenka et al. ............ 250/254 |
| 5,894,095 | A | * | 4/1999 | DeMali ................. 73/862.27 |
| 6,408,953 | B1 | * | 6/2002 | Goldman et al. ............. 175/39 |
| 7,124,578 | B2 | * | 10/2006 | Noel ........................ 60/468 |

FOREIGN PATENT DOCUMENTS

| EP | 1 083 023 A2 | 3/2001 |
| FR | 2 625 123 A1 | 6/1989 |

* cited by examiner

*Primary Examiner*—Max Noori
(74) *Attorney, Agent, or Firm*—Oblon, Spivak, McClelland, Maier & Neustadt, P.C.

(57) ABSTRACT

A method for detecting and optionally a method for quantifying drilling anomalies in a metal part. The drilling method includes determining a value set of at least one of the two following parameters, depending on the time: the penetration axial stress of a drill bit into the metal part and the torque generated during at least one portion part of the drilling.

20 Claims, 41 Drawing Sheets

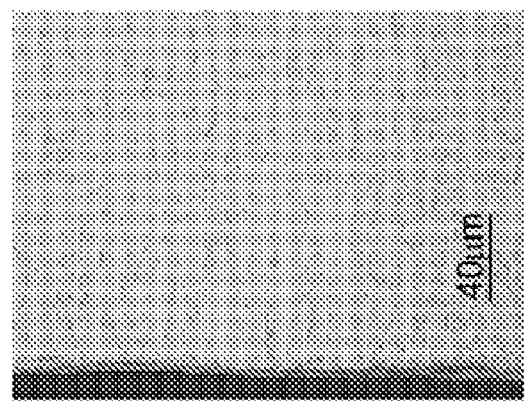
Figure 7c
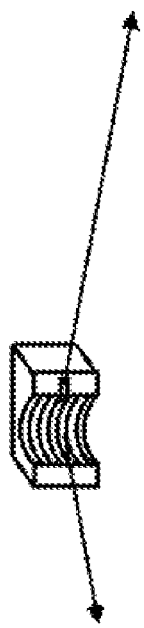
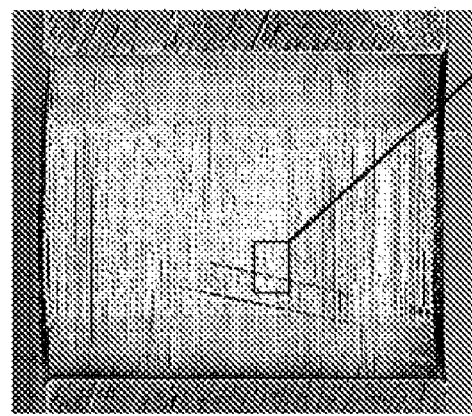
Figure 7a
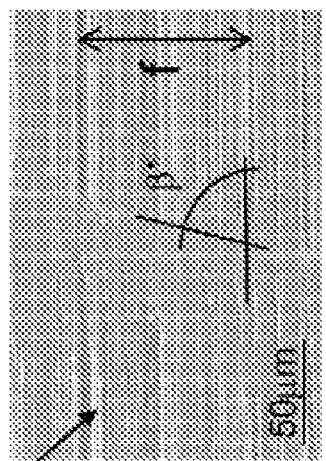
Figure 7b

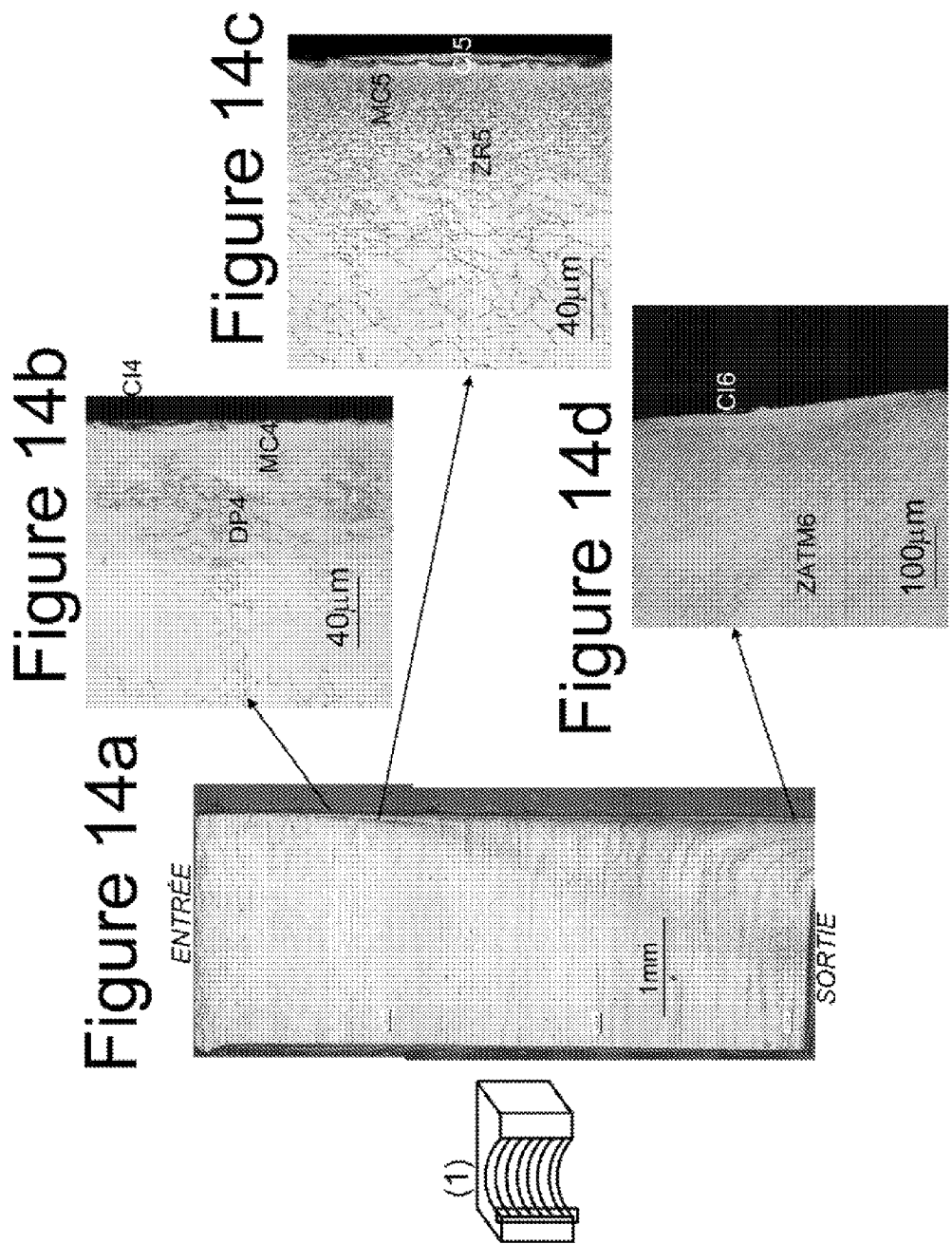

METHOD FOR DETECTING AND QUANTIFYING DRILLING ANOMALIES

This invention relates to the field of machining metal materials using a cutting tool rotating about its axis; it more particularly relates to drilling bores using a drill bit such as one with cemented carbide.

In order to achieve drilling bores in a part, the latter is positioned between the jaws of a vice, being in turn fixed on a stress measuring table. Then, a drill bit with the appropriate diameter is brought near the part surface and is rotated while being axially driven for allowing it to progress into the material. The drill bit 10, being exemplified on FIG. 1, comprises a head 11 having the shape of a frustoconical tip with one or more cutting edges 12, the wear thereof Vb being measured in rake angle. The drill bit is provided with helical grooves 13 for removing chips. The external edge of the grooves forms the list 14. The drill bit 10 is maintained in a movable tool support 2 being in turn mounted in an appropriately guided spindle. The driving device of the drill bit comprises a first motor driving the spindle into rotation about its axis and another motor allowing for the axial shift of the spindle. This is illustrated on FIG. 2. Such a machining device is also provided with an external or internal lubricating system 3 by the drill bit. The part 4 is itself clamped in a vice 5.

In the absence of anomalies, the bore consists in a cylinder with a diameter being defined by that of the drill bit and its flanks showing regular machining streaks, perpendicular to the bore axis. However, in some cutting, bore geometry and tool wear conditions, the bore is likely to have a number of anomalies formed by material deposits resulting from a bad chip removal or from a local modification of the metallurgic structure due to coupling of a mechanical and thermal effect.

Three important anomaly types are known.

A first anomaly, so-called isolated chip gluing, referred to herein after as CCI, can be seen on the internal wall of the bore. These are fractioned chips, welded on the bore surface and oriented in the direction perpendicular to the bore axis.

A second anomaly so-called sheared material strip, referred to herein after as BMC, results from a strong mixing of abundant chips and material on the bore surface during the drilling stage. Such a material assembly is forced at the bore surface during the cutting operation, then smoothed by the lists when the drill bit goes up, leaving a multiplicity of streaks at the bore surface.

A third anomaly that can be seen is referred to as the thermo-mechanically affected area or ZATM. As opposed to the two previous anomalies, the mechanical effect is coupled with a much higher thermal effect, strongly modifying the microstructure of the bore edge on a larger thickness, and on all or part of the depth at the inlet and the outlet of the bore.

The present Patent Application is not restricted to such typical anomaly, but others could be taken into consideration. The detection and quantification thereof will then depend on their PM signature.

The origins of such drilling anomalies could be numerous. The following anomalies could be mentioned, without any limitation:

- an unsatisfactory lubrication due to the pump unexpectedly stopping, to an inadequately oriented lubricating agent jet or to a bad oil/water ratio;
- a poor chip removal, in particular for deep and/or oblique bores for which material jamming becomes a frequent phenomenon;
- unadapted or poorly programmed cutting parameters (in particular the use of an excessive cutting rate beyond a critical rate and an underadvance);
- a worn and/or poorly resharpened tool or further provided with a anomalyive coating;
- an inappropriately adapted tool support;
- an inappropriately balanced spindle;
- a tool being inappropriately positioned in the tool support;
- a part being poorly clamped in the vice;
- a bad tool selection: geometry, type, nature, . . . ;
- a part having been submitted to an unadapted thermal treatment;
- too short a time delay between each drilled bore and specifically in SL drilling;

...

OBJECT OF THE INVENTION

In the aircraft field, in particular, and more specifically for parts being critical relating to safety, for example, the presence of one or more of the above described anomalies is not wanted.

It is therefore preferable to detect the presence thereof and to quantify them as soon as possible, i.e. in particular when a blank is being drilled in order to throw away the part or to choose the most appropriate approach for removing them during the finishing steps.

Moreover, knowing the anomaly type, its severity and its consequences on the mechanical properties could allow for a better part control/quality without systematically relying on non destructive trials, thereby resulting in a significant time saving.

The main object of this invention is therefore to provide for the detection of at least one of the above mentioned anomaly types, such anomalies being considered either alone or in combination upon a bore drilling and through non destructive means.

In addition, another object of this invention is to quantify the anomaly type(s).

Another object of this invention is also to provide for the detection of at least one anomaly starting from three dimension stresses acquired as a function of the time during the drilling operation, the acquisition of such parameters being advantageously achieved from a traditional measuring table requiring no sophisticated sensors.

SUMMARY OF THE INVENTION

According to this invention, such objects are reached using a method for detecting and optionally quantifying drilling anomalies into a metal part, the drilling operation being performed by a drill bit, characterized in that it consists in one hand of determining a value set of at least one of the two following parameters, depending on the time, namely the penetration axial stress of the drill bit into the metal material Fz(t) and the torque C(t), generated during at least one part of the drilling operation, then isolating the $FZ_{threshold}$ and $C_{threshold}$ values corresponding to a threshold and representative of the absence of any anomaly, the $FZ_{max}$ and $C_{max}$ values corresponding to the maximum values and being representative of the presence of an anomaly, and then determining the $Fz_{max}/Fz_{threshold}$ and $C_{max}/C_{threshold}$ ratios and/or optionally the $Area_{Fzmax}/Area_{Fzthreshold}$ and/or $Area_{Cmax}/Area_{Cthreshold}$ area rations being the surfaces under the Fz(t) or C(t) curves having as a lower boundary $Fz_{threshold}$ or $C_{threshold}$ and as a higher boundary $Fz_{max}$ or $C_{max}$ reported to the areas under the Fz(t) or C(t) curves having as a higher boundary $Fz_{threshold}$ or $C_{threshold}$, so as indicate the anomaly type and optionally its severity, and on the other hand, determining a set of values associated to the wear under rake Vb of the drill bit, such as $Nb_{crit.}$ corresponding to the critical number of bores being drilled for a $Vb_{crit.}$=0.3 mm (drill bit rejected), as well as Vb* and Nb* corresponding to the first occurrence of the anomaly into consideration and also isolating the $Fz_{moy}$(Nb) and $C_{moy}$(Nb) values as a function of the number of bores being drilled and corresponding to the mean values of signals at the inlet of cutting edges, and determining the $FZ_{moy}(Nb)/Fz_{moy}(Nb=1)$ and/or $C_{moy}(Nb)/-C_{moy}(Nb=1)$ ratios, et/ou optionally the $Area_{Fzmoy(Nb)/-AreaFzmoy}(Nb=1)$ and/or the $Area_{Cmoy}(Nb)/Area_{Cmoy}(Nb=1)$ area ratios, so as to indicate the occurrence of an anomaly associated to wear.

The anomalies are quantified by defining severity criteria depending on such stresses and/or on the cutting parameters and geometrical parameters and/or rake wear parameters of the drill bit. In addition to such anomalies, any other anomalies resulting in a stress or torque increase without actually showing on the signals a threshold value and/or a maximum value is treated more specifically through an area analysis. The threshold value is then obtained from a drilling assay using the same cutting parameters without any anomaly being generated, in the case where cutting parameters (Vc, f) are not those generating the anomaly.

Thus, the method of the invention relates at least to one of the following features:
- the signal analysis of stress Fz and torque C deducted from transversal stresses (Fx and Fy);
- the calculation of rations between a maximum value and a minimum value (threshold value) of the penetration stress (Fz) and the torque (C);
- the calculation of areas under the signal curves as well as that of the ratios thereof;
- the calculation of burr lengths (Lb) of the tilting angles for streaks (β') left by noses or lists when the drill bit is going up;
- the calculation of the drilling time (tp) and the deburring time (td) as means for checking a programming error;
- the observation of colour halos at the bore inlet and/or outlet as non destructive means for detecting the morphology of the ZATM and for evaluating the related depth;
- the analysis of the consequences of wear in Vb of the drill bit on the signal aspect and the characteristic features thereof.

This invention also relates to a device for implementing a device comprising a means for representing and treating transversal stresses Fx, Fy and axial one Fz as a function of time between $t_0$ and $t_4$, a means for storing data representative of signal for the detection and quantification of anomalies and a means for representing and treating such data as well as those associated to the rake wear of the drill bit.

The method of this invention will be now described more in detail referring to the accompanying drawings wherein:

FIG. 7 shows the surface of half a typical bore with no anomaly with a photograph 7a of the surface onto which machining streaks and helical streaks can be observed;

Figure 1:
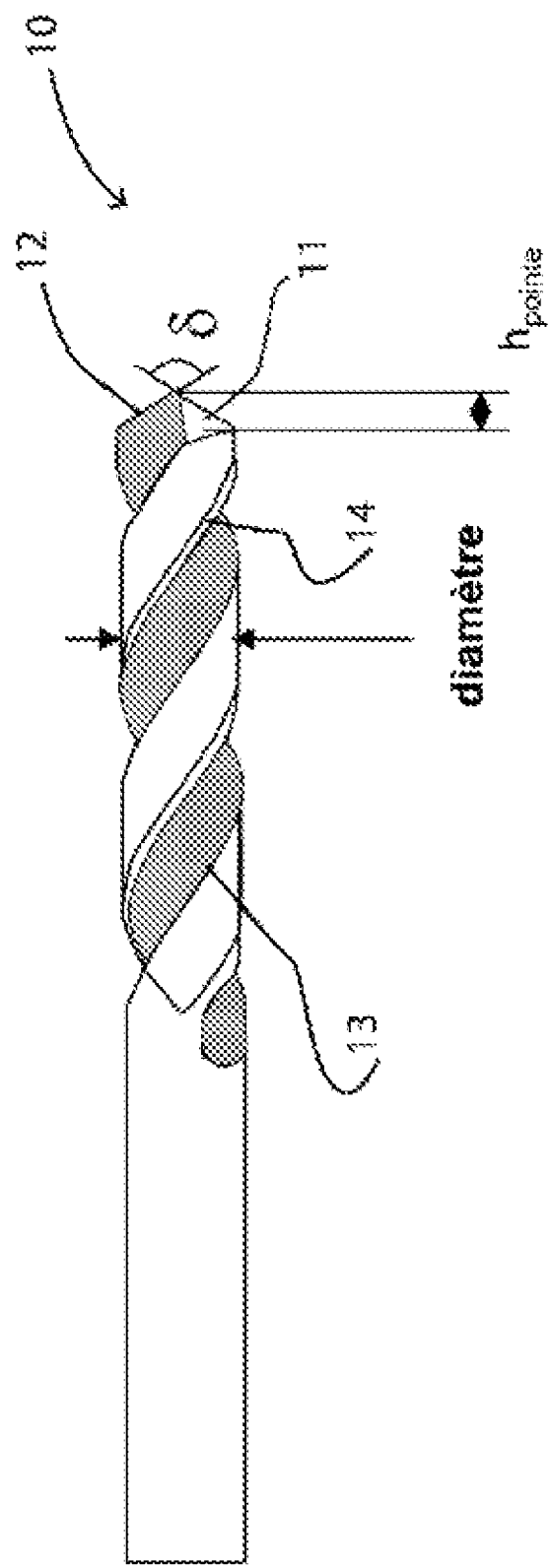
FIG. 1 illustrates a drill bit with a head having the shape of a frustoconical tip and two cutting edges.
Figure 2:
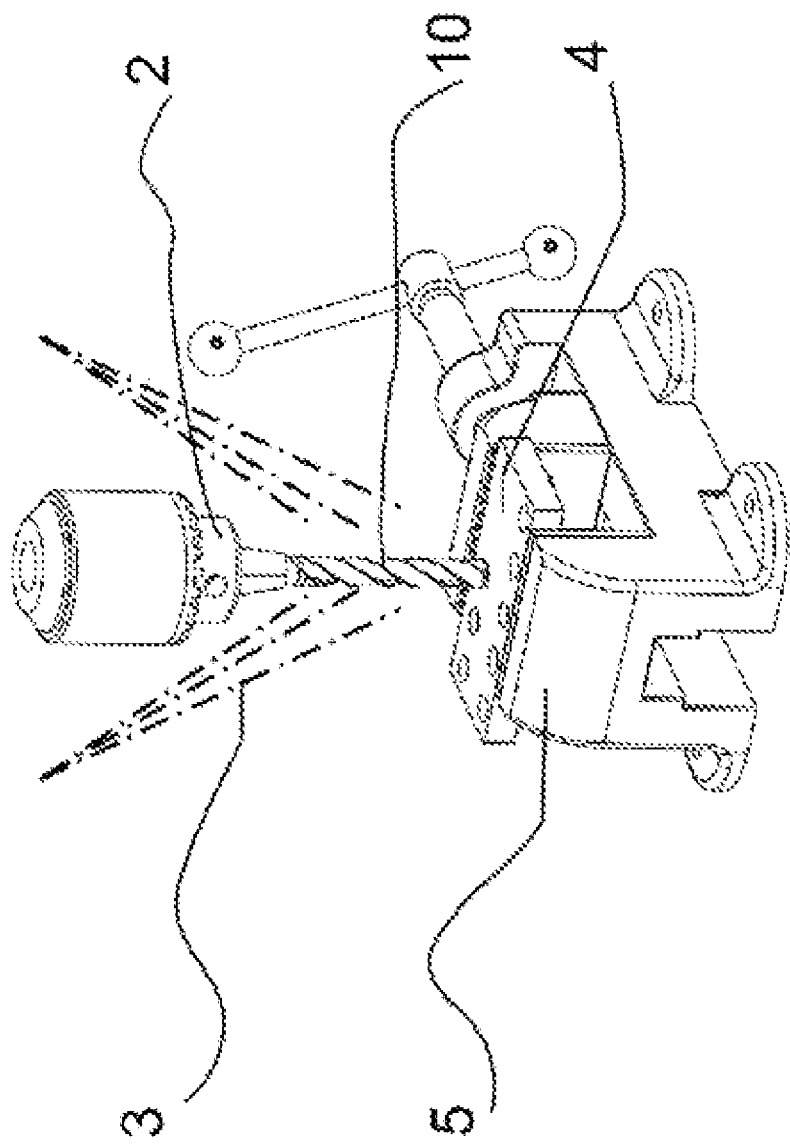
FIG. 2 is an illustration of the drilling device.
Figure 9:
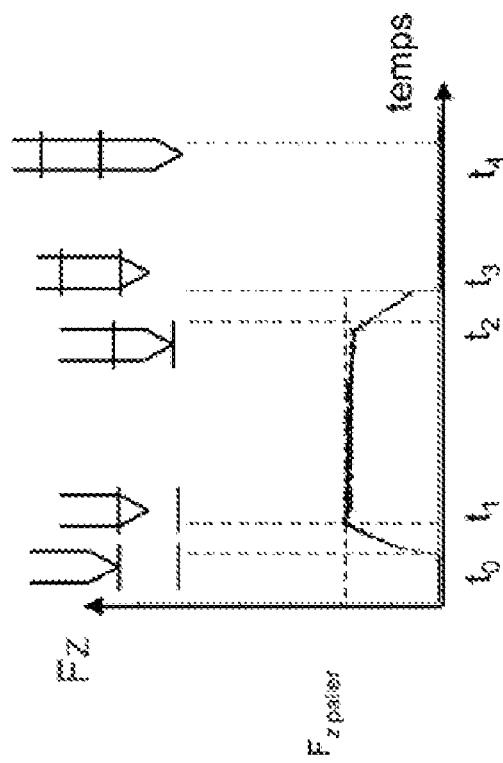
Figure 10:
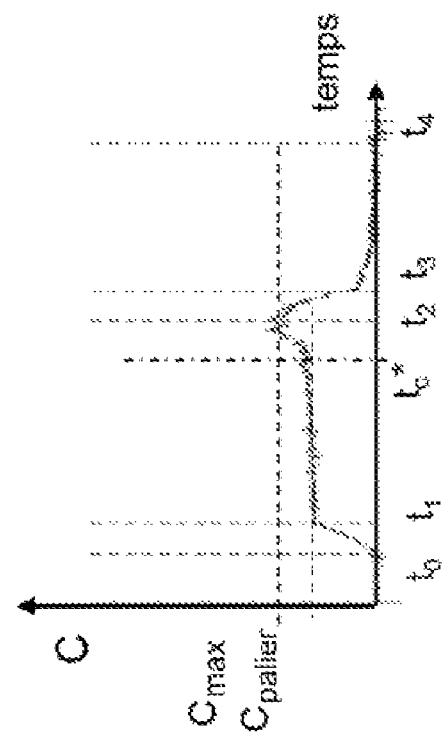
Figure 12:
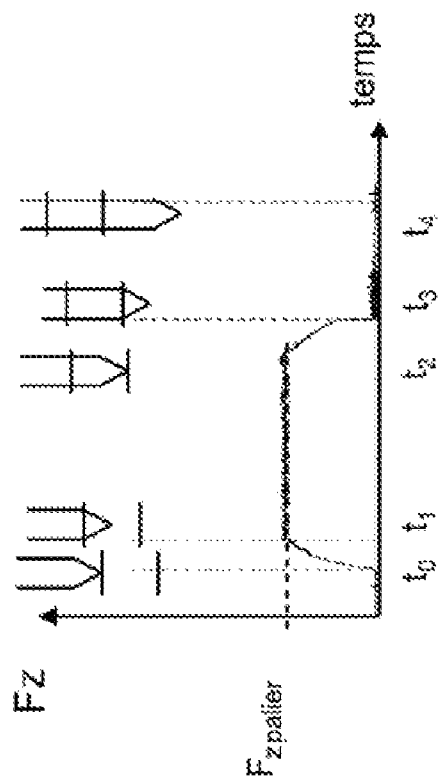
Figure 13:
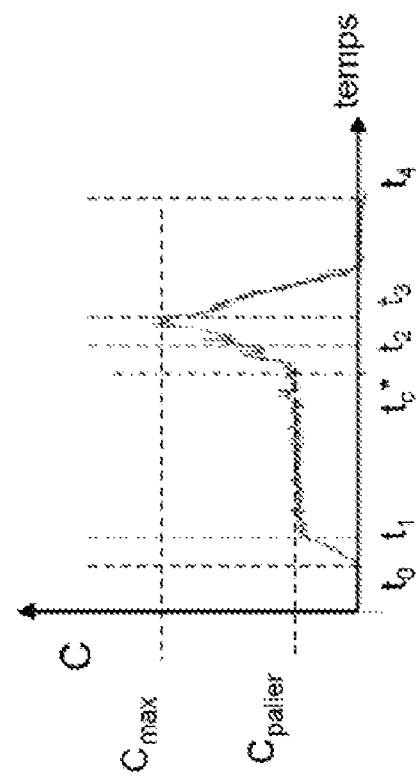
Figure 15:
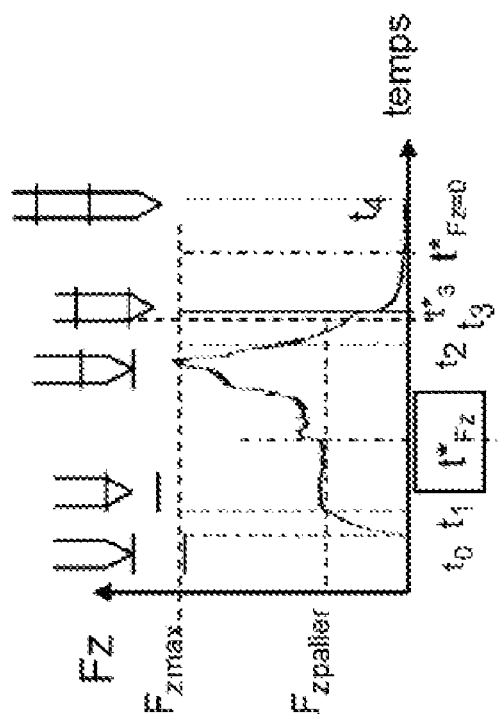
Figure 16:
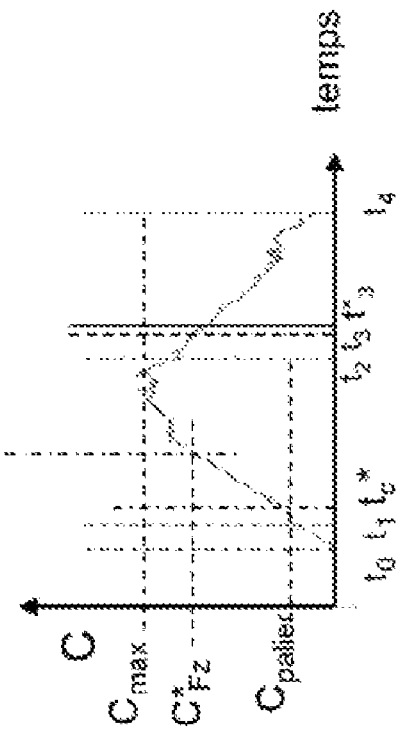
Figure 17:
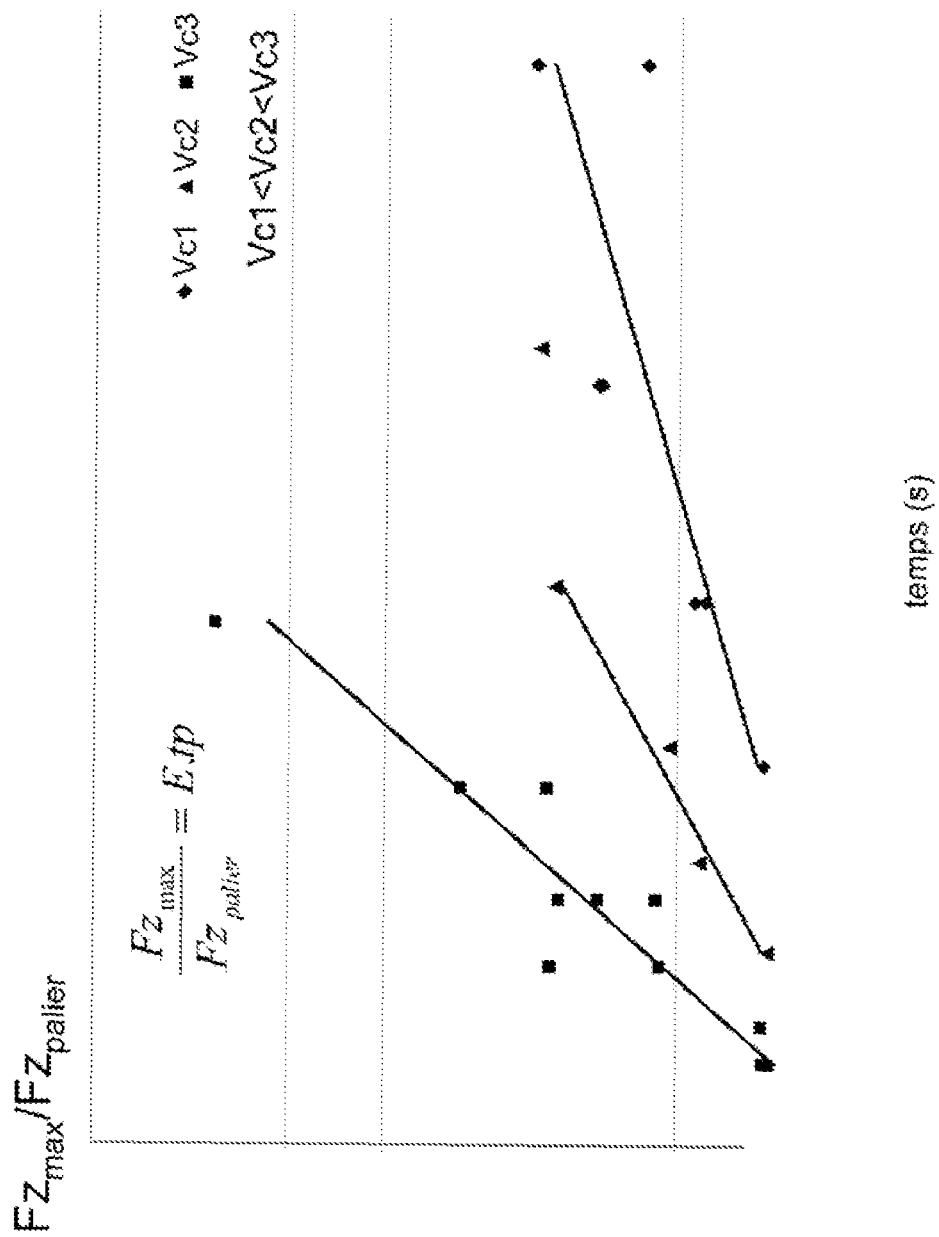
Figure 18:
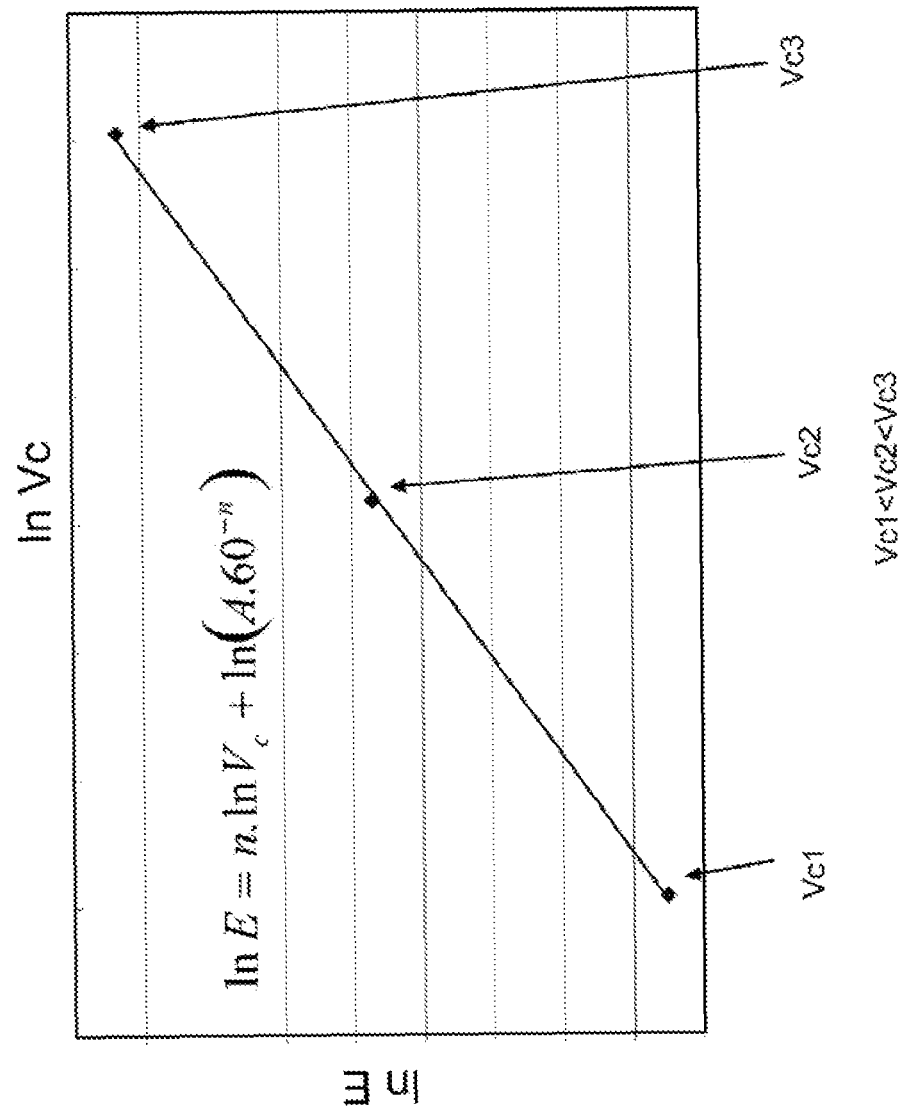
Figure 19:
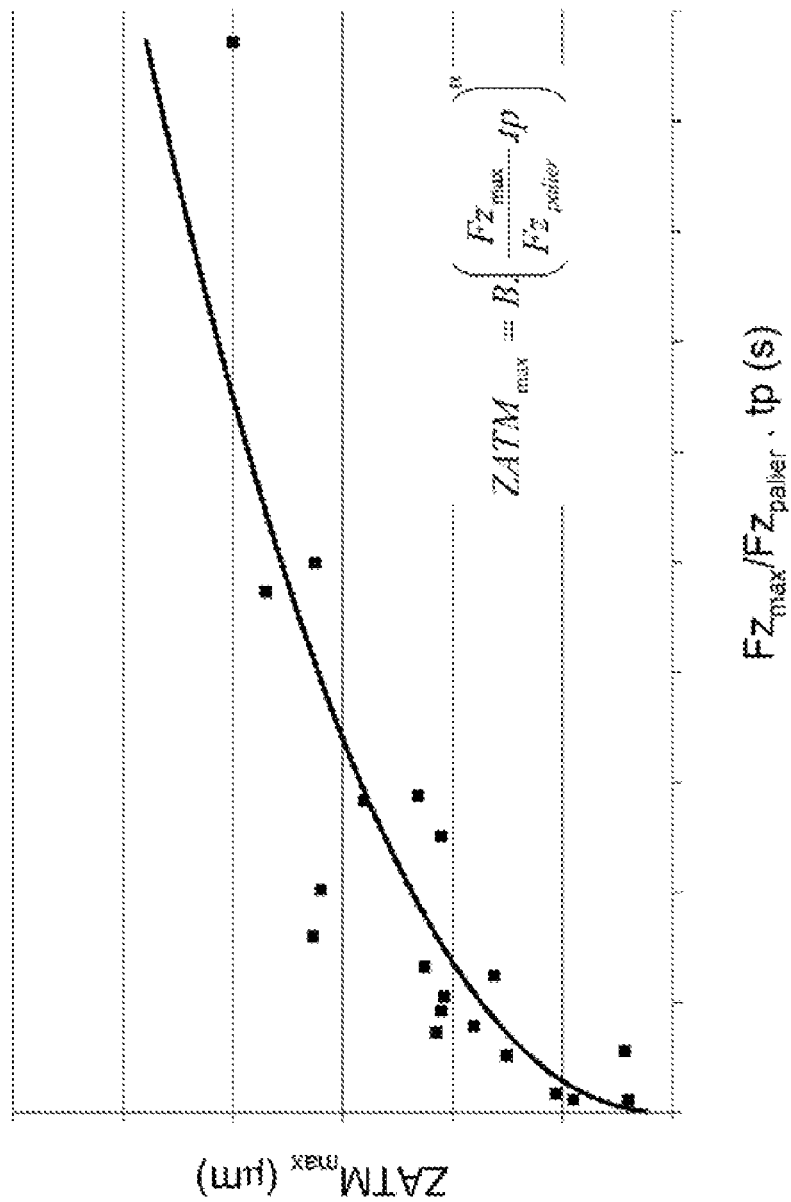
Figure 20:
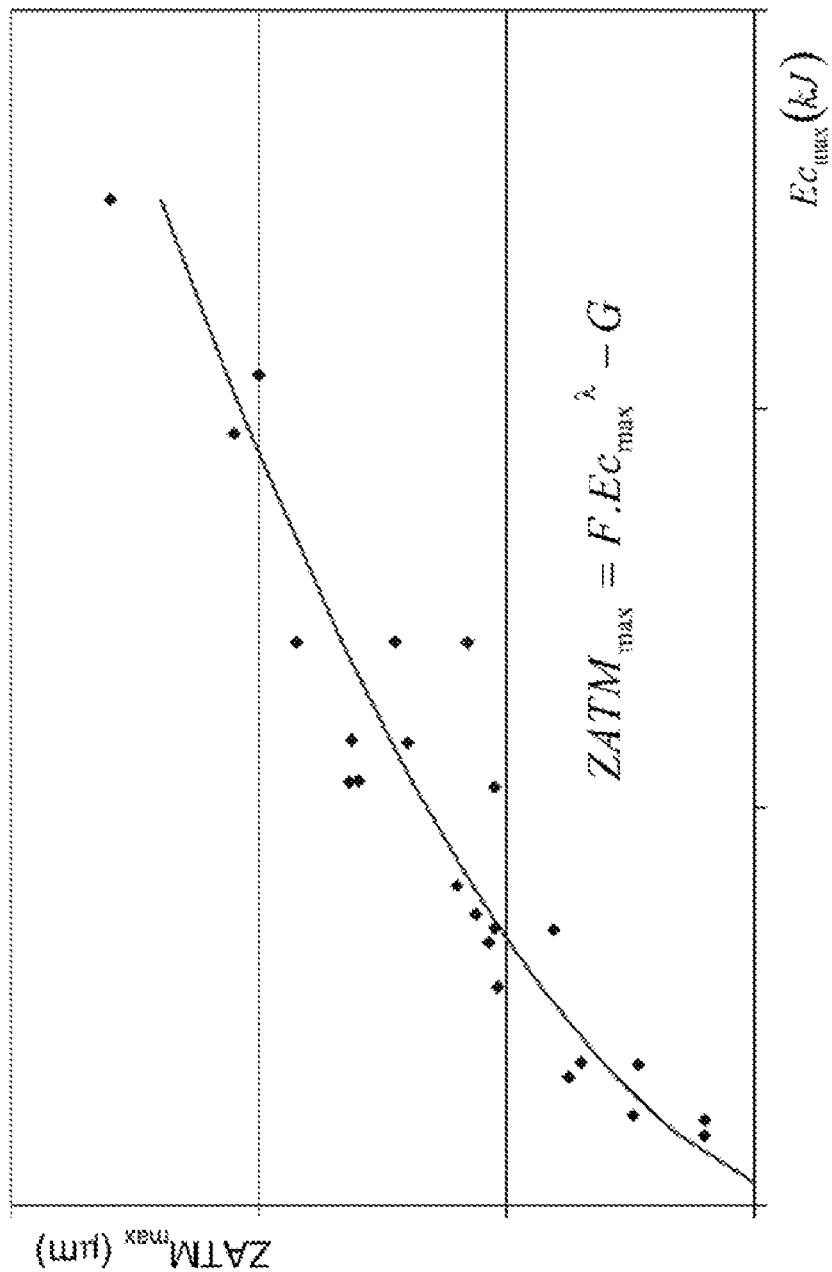
Figure 21:
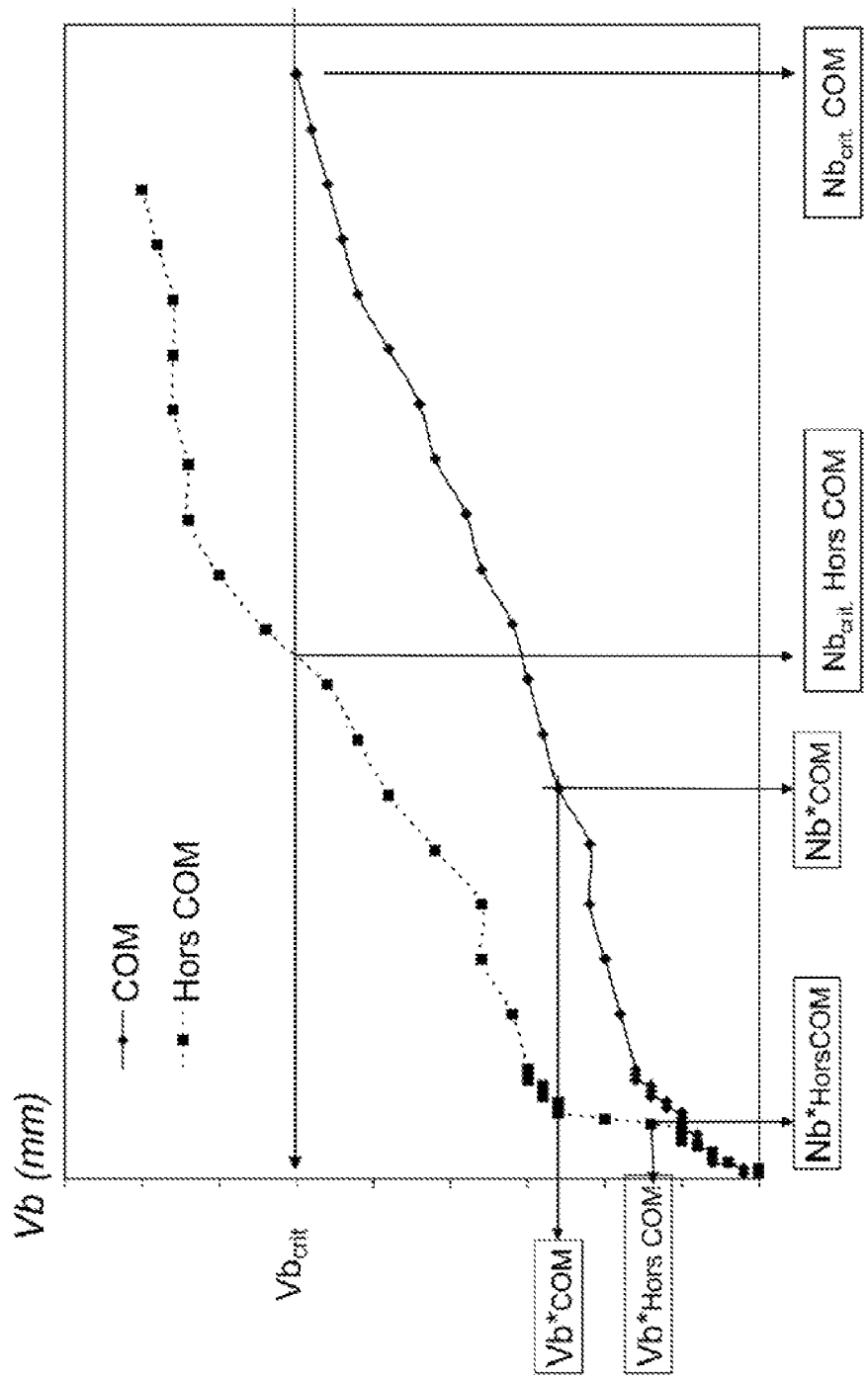
Figure 22:
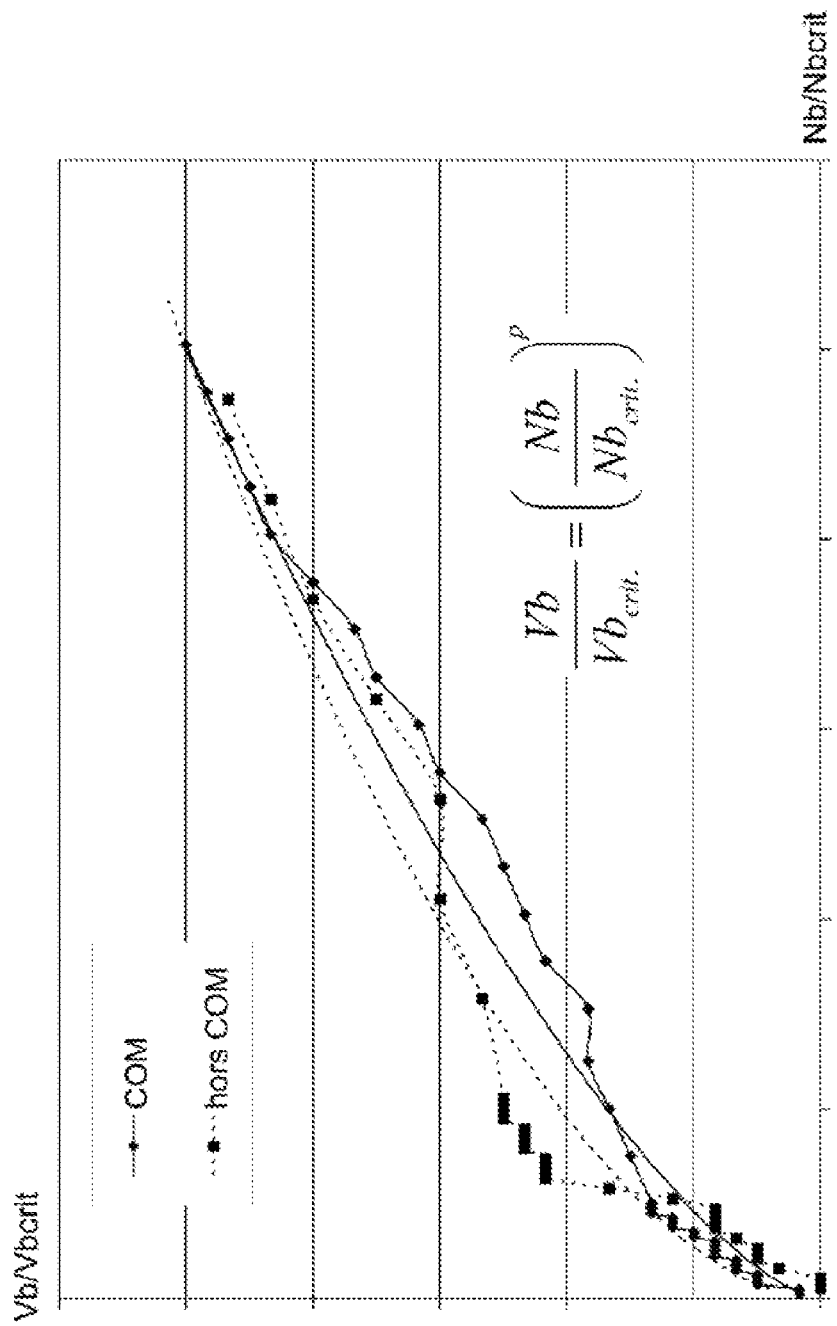
Figure 23:
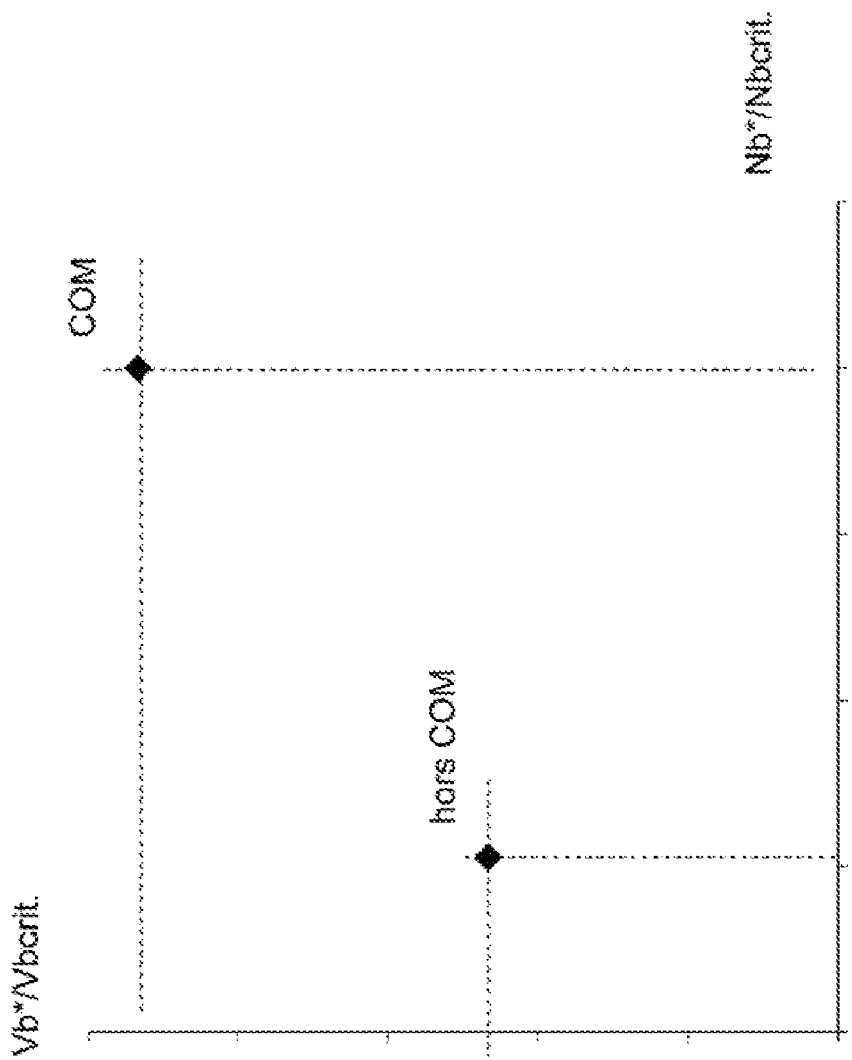
Figure 24:
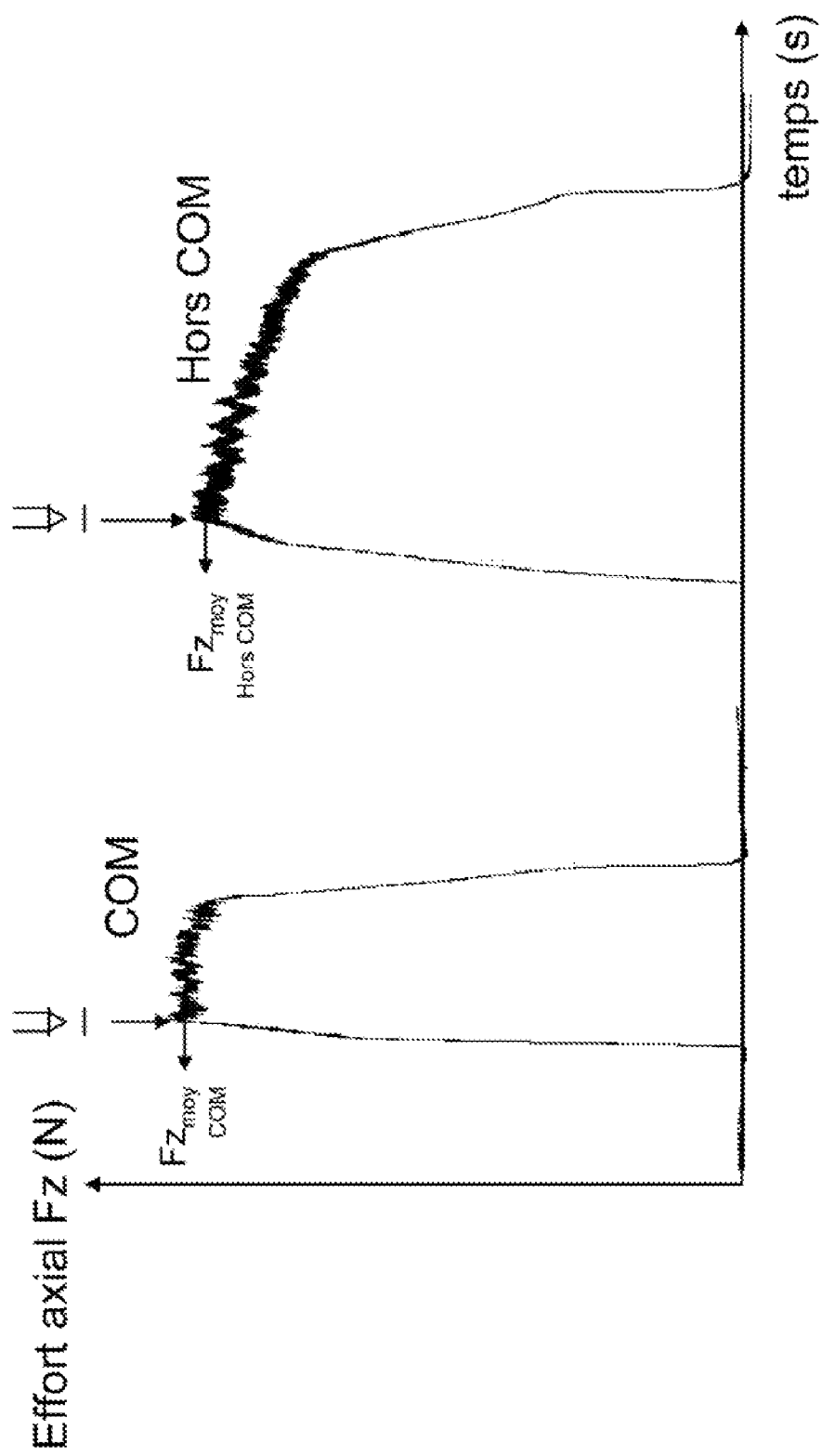
Figure 25:
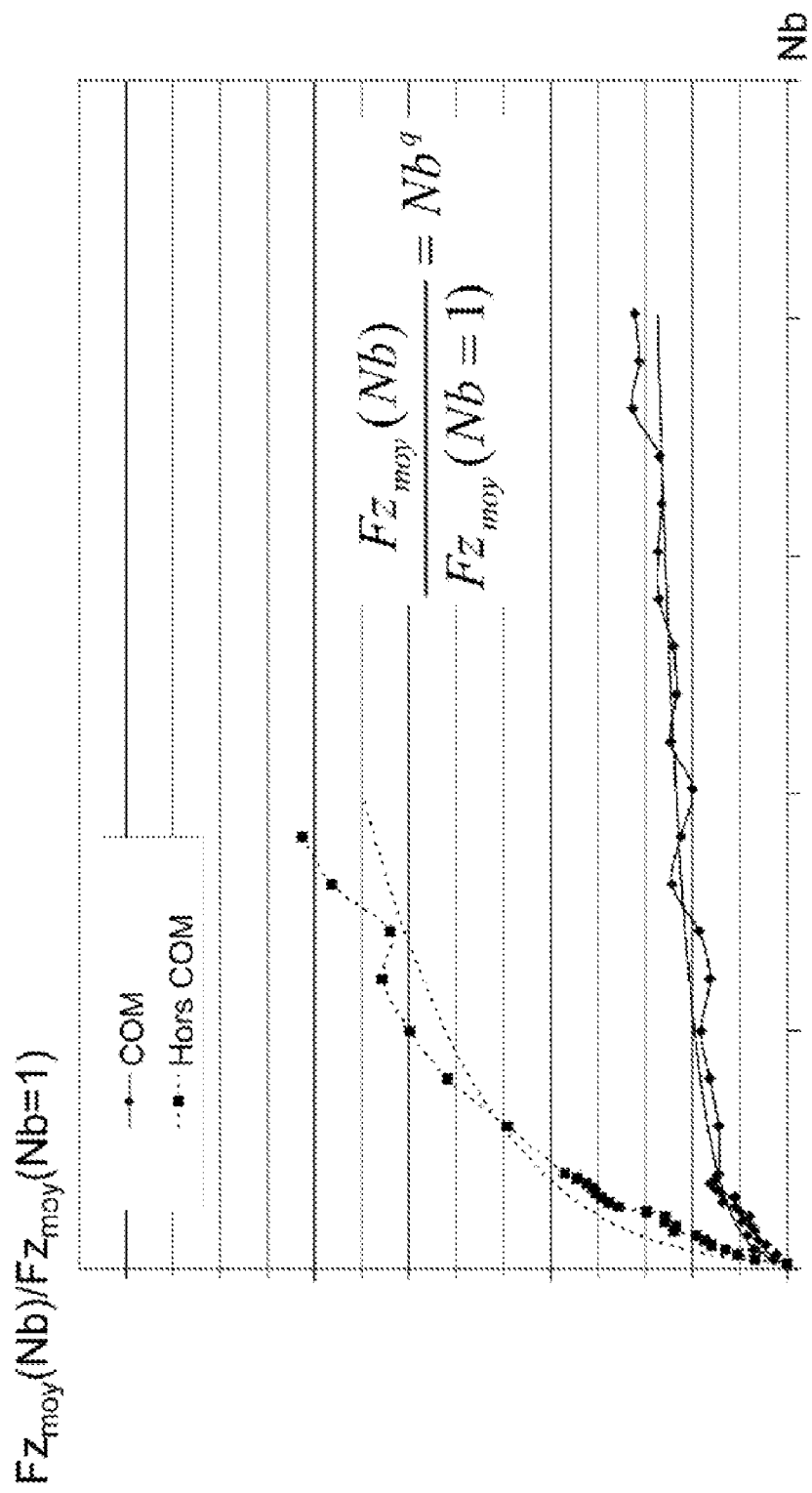
Figure 26:
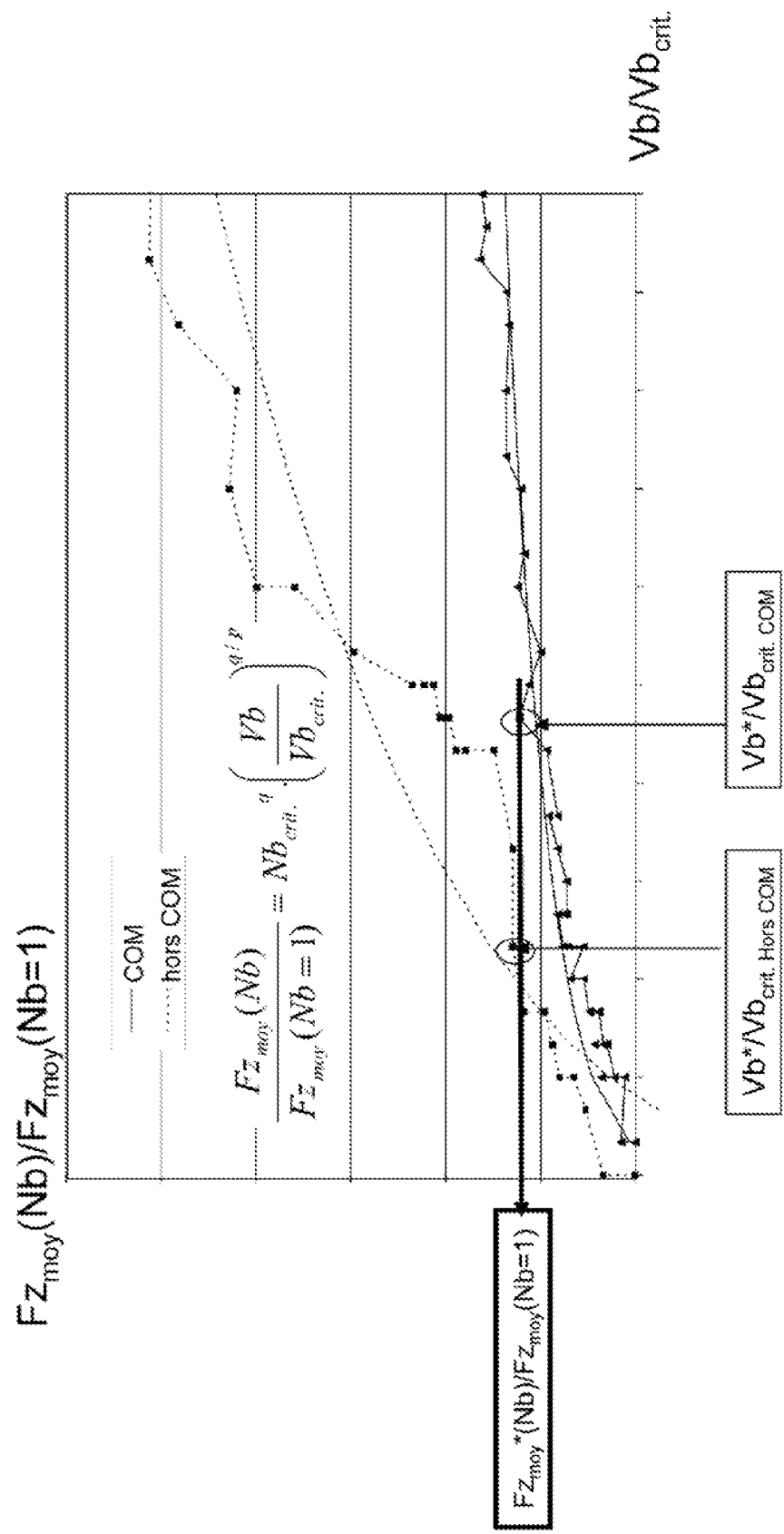
Figure 27:
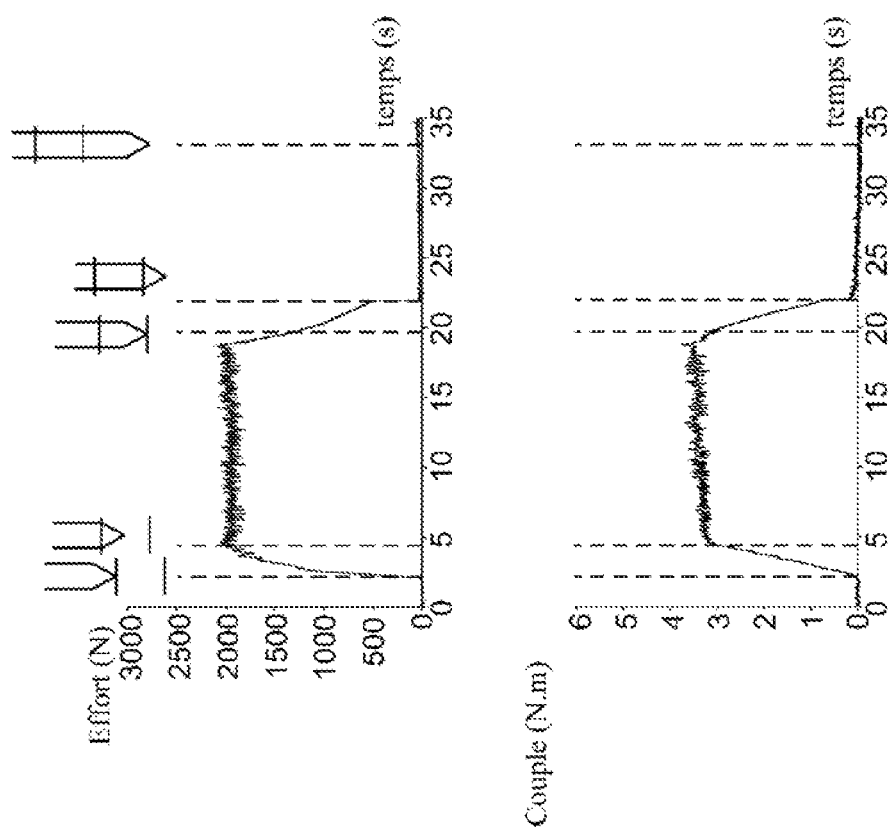
Figure 28:
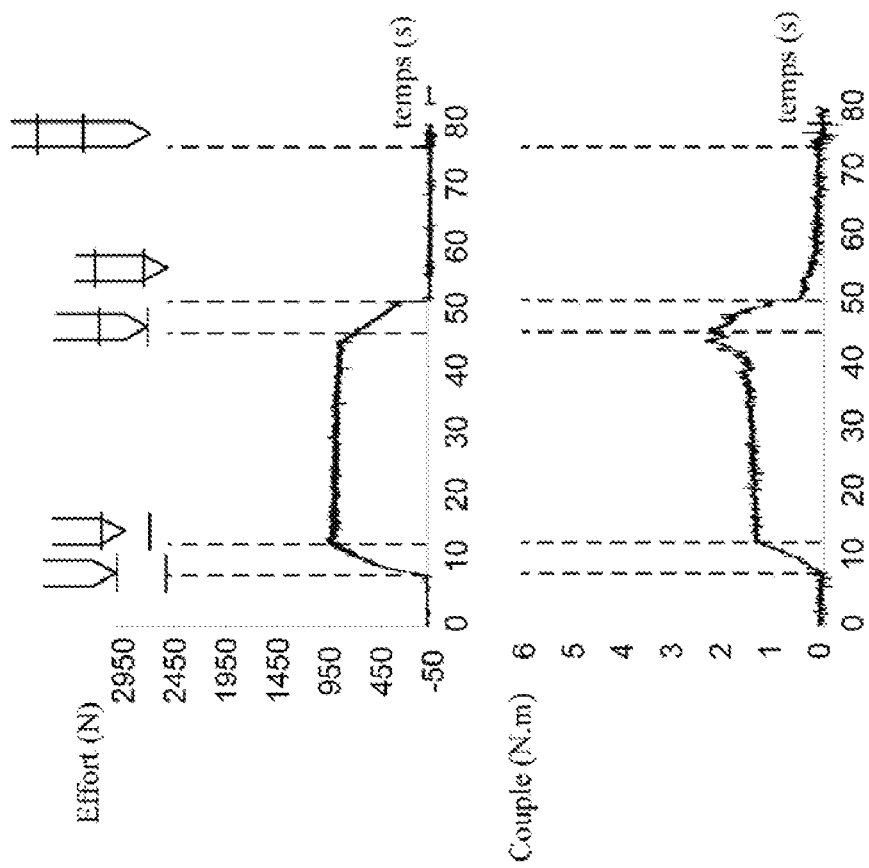
Figure 29:
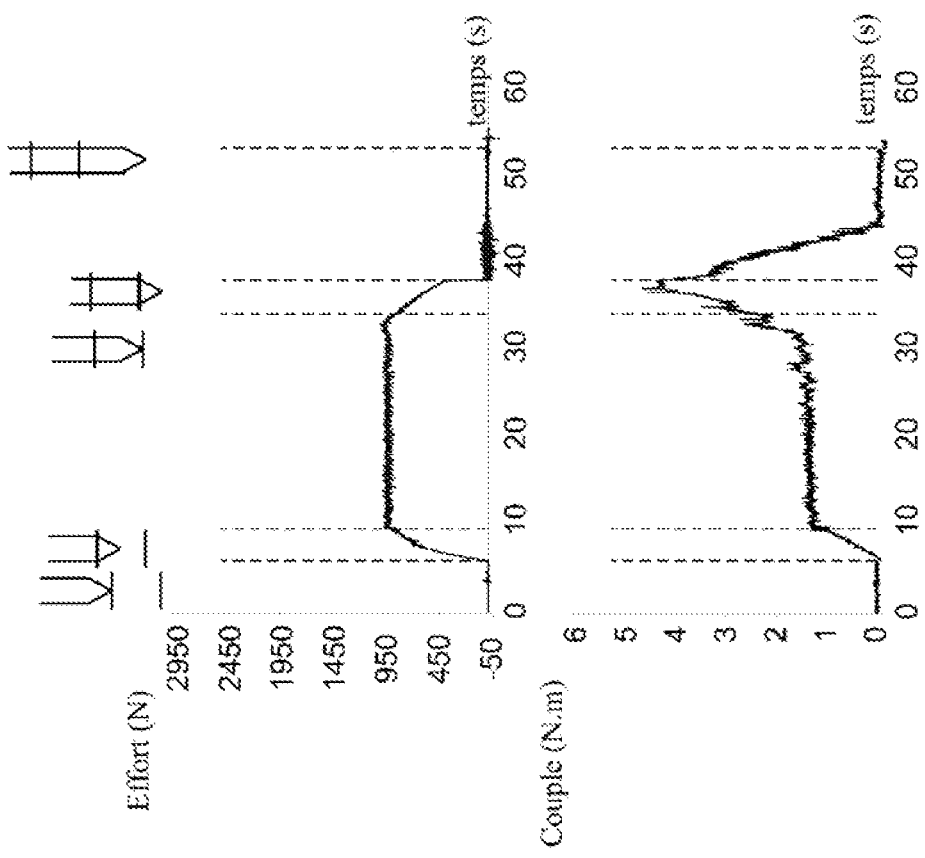
Figure 30:
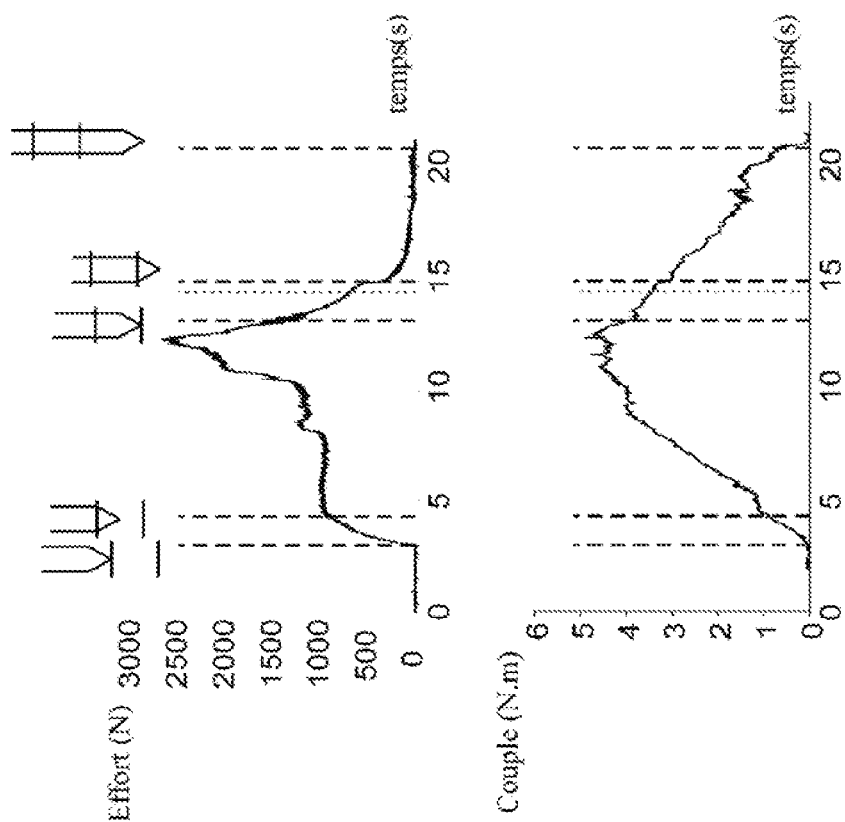
Figure 31:
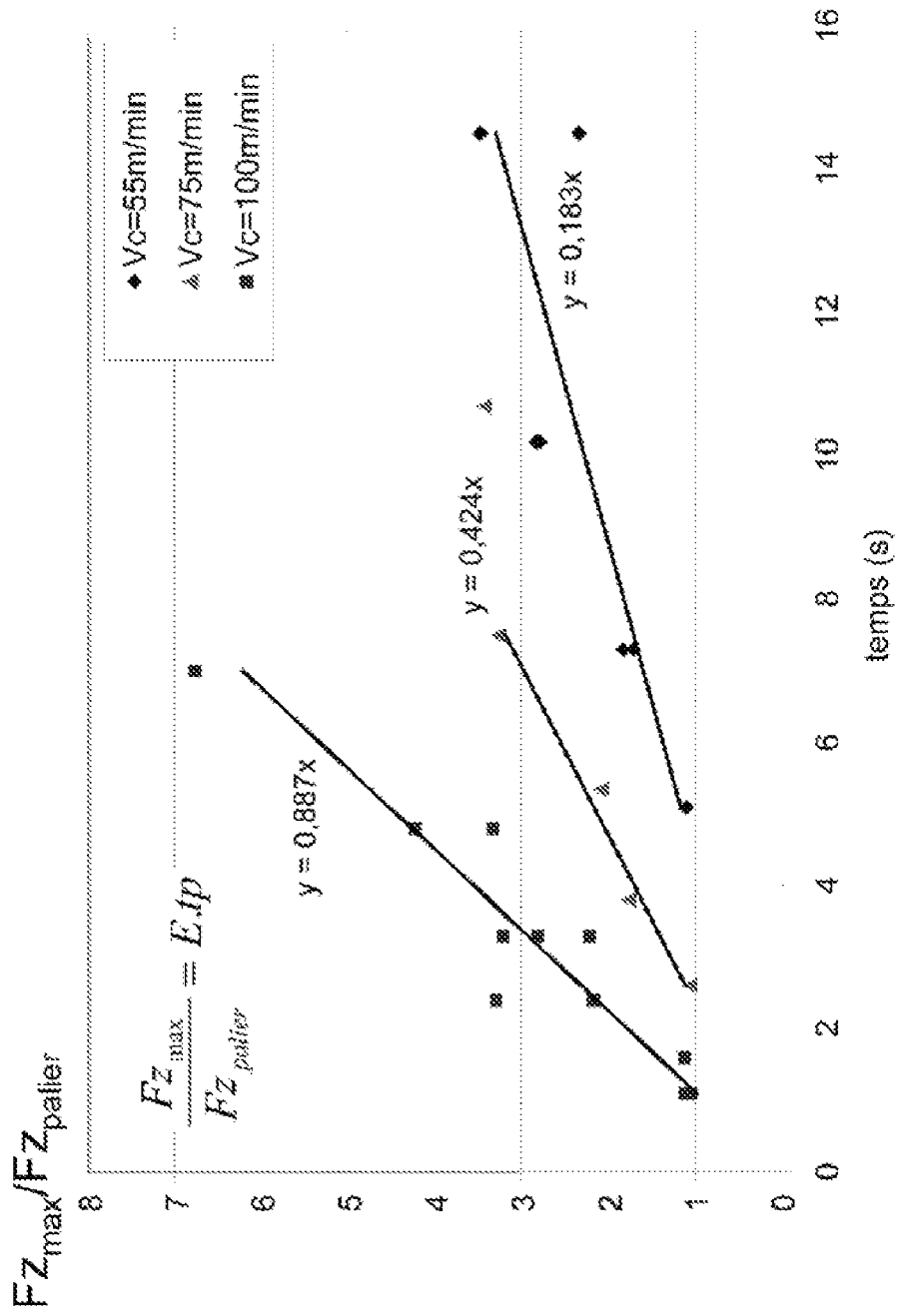
Figure 32:
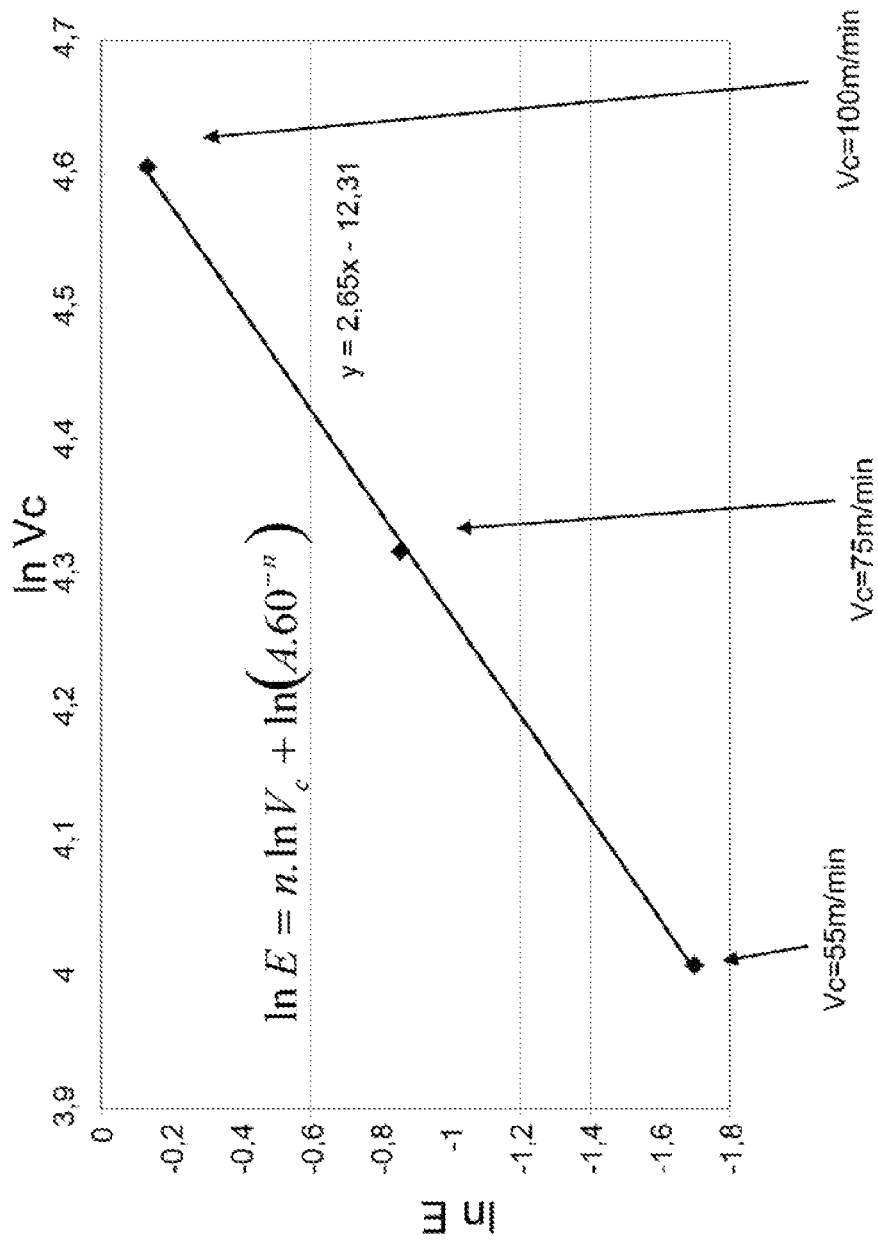
Figure 33:
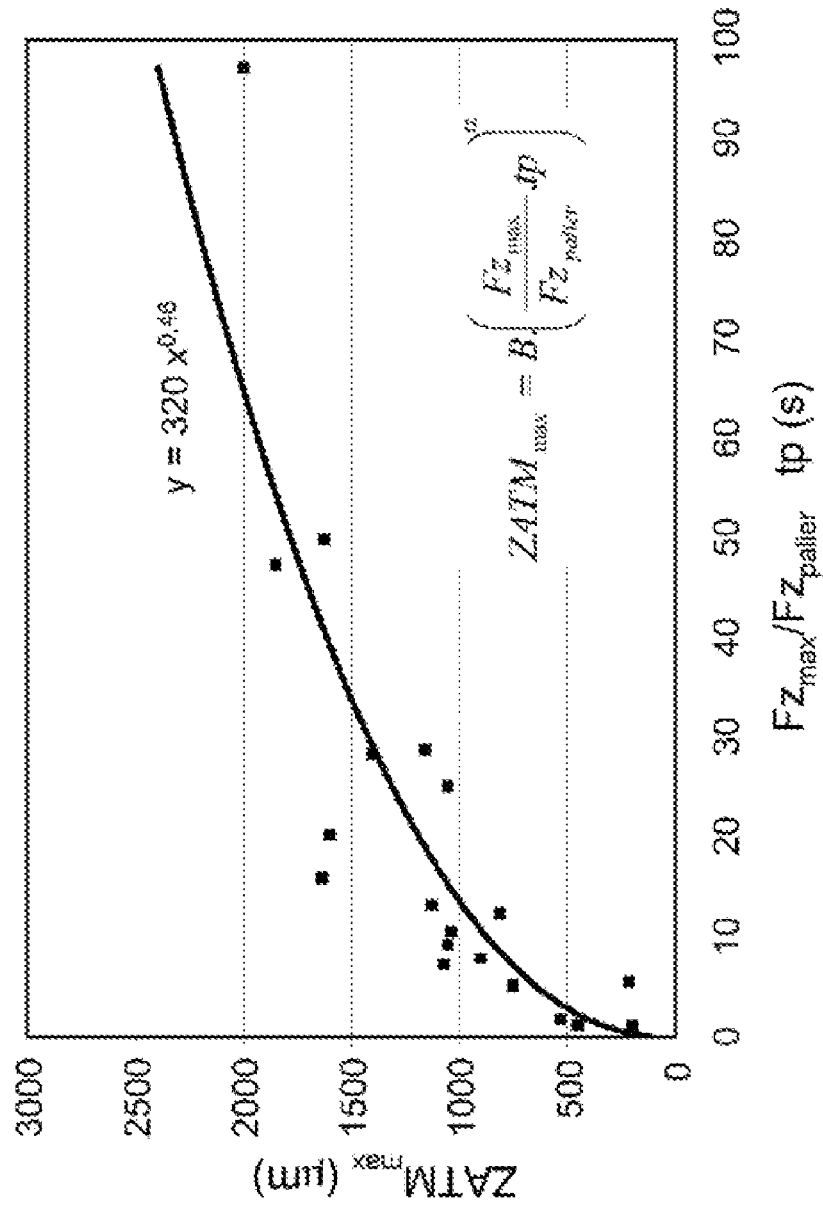
Figure 34:
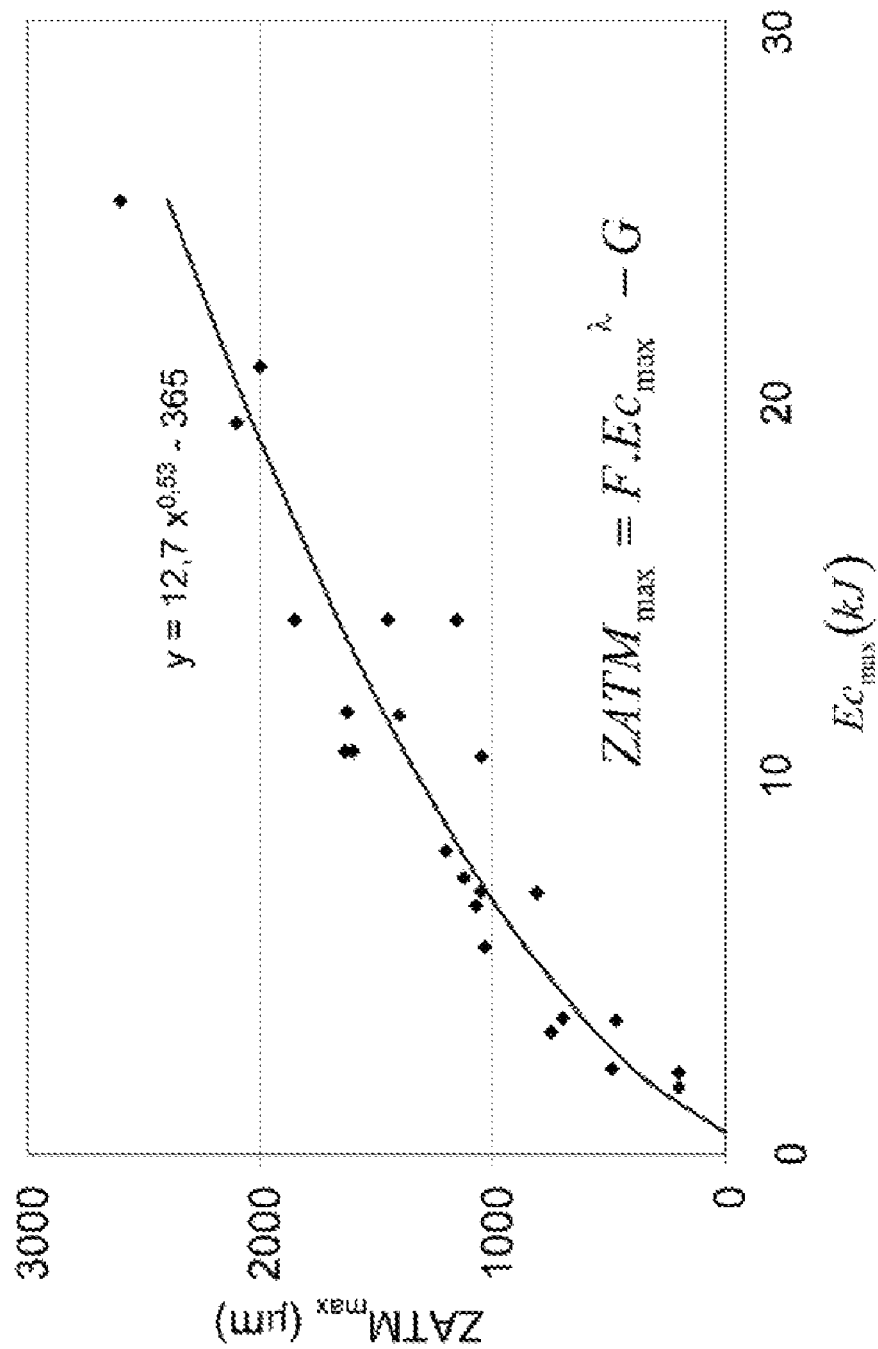
Figure 35:
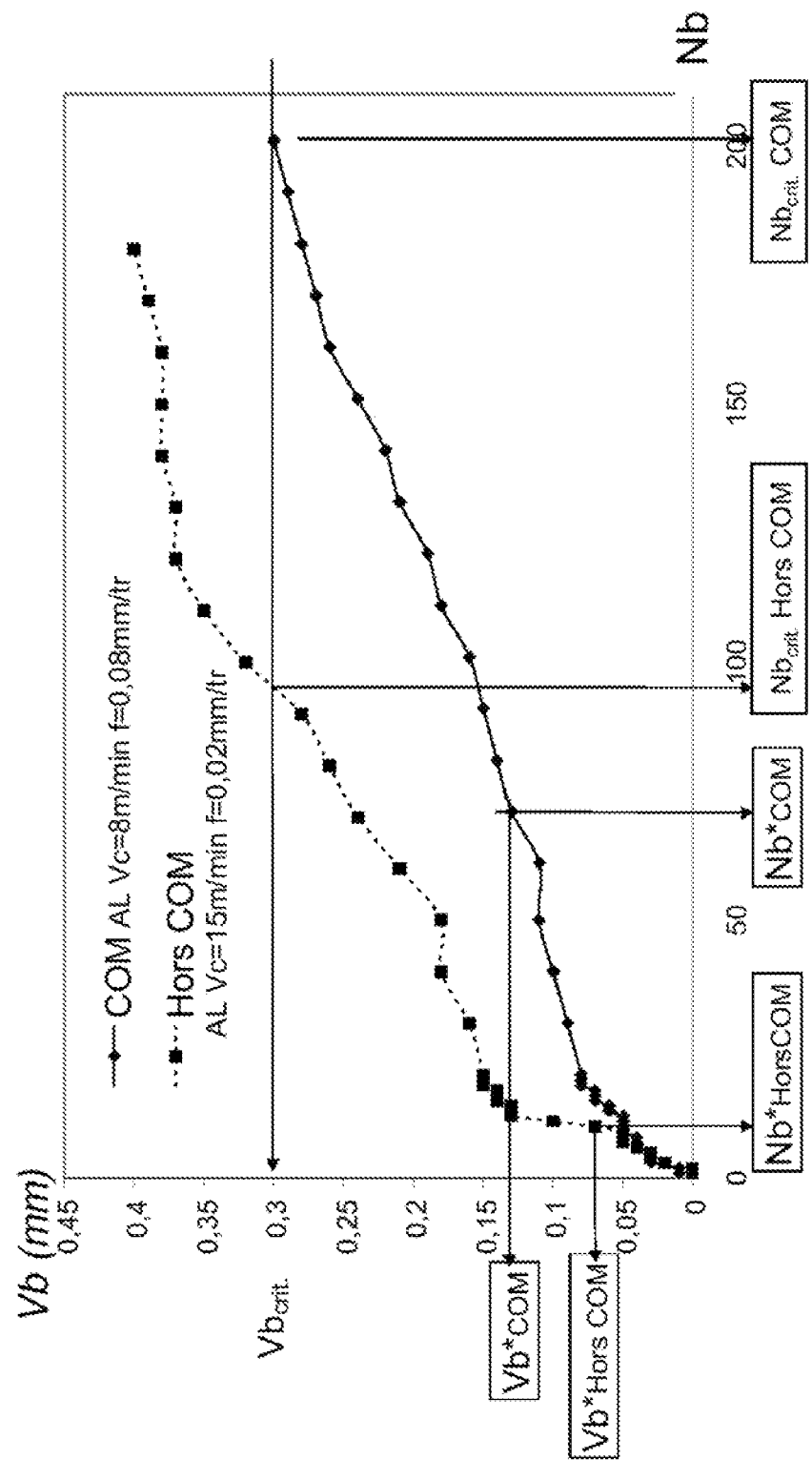
Figure 36:
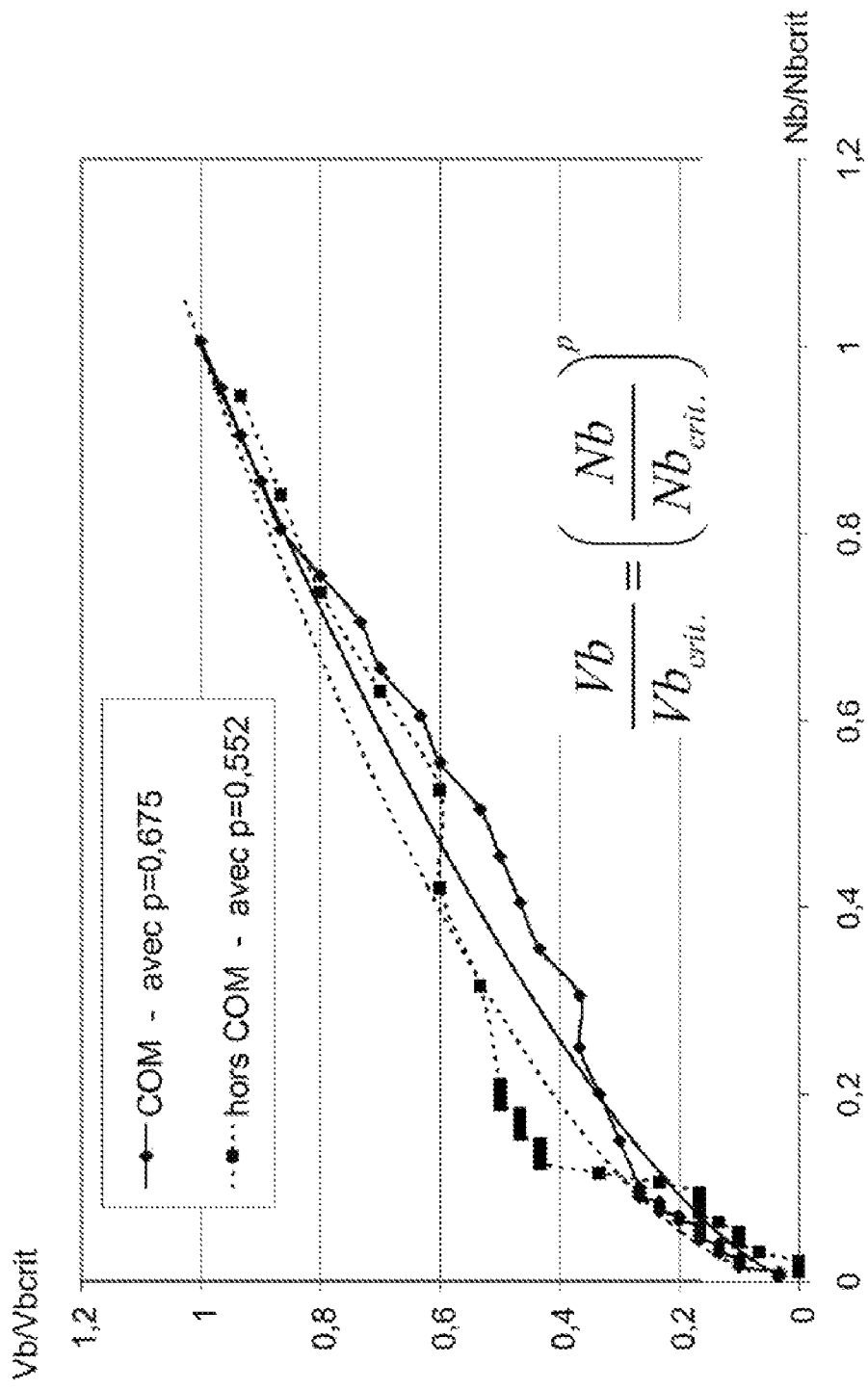
Figure 37:
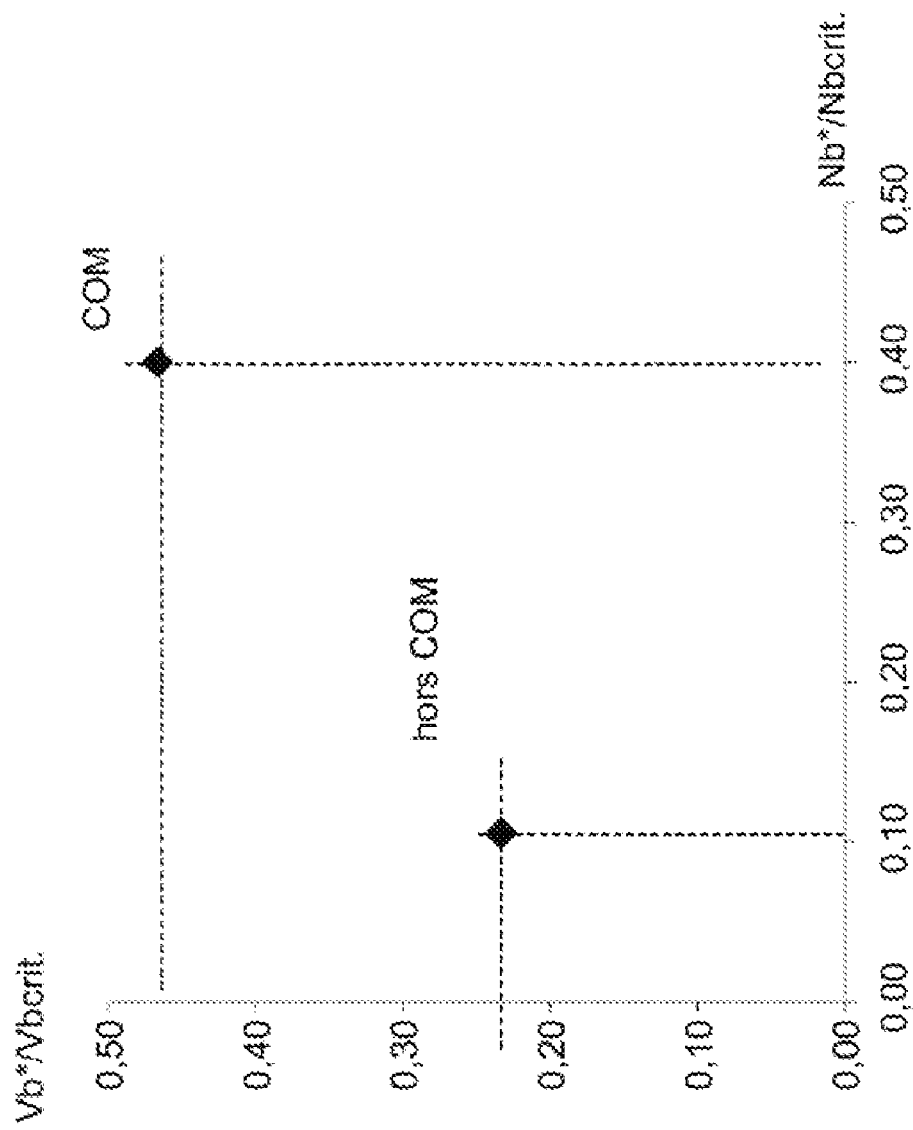
Figure 38:
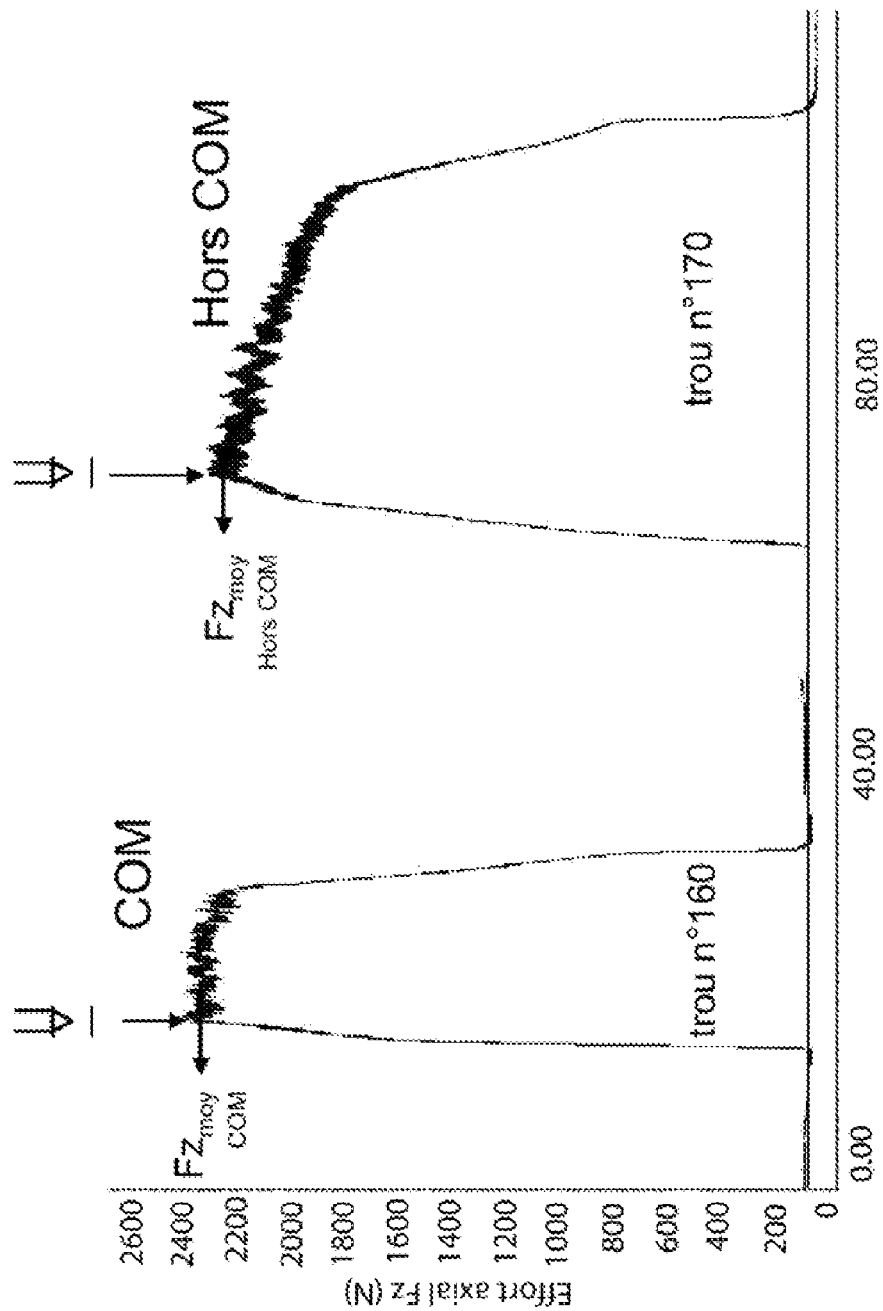
Figure 39:
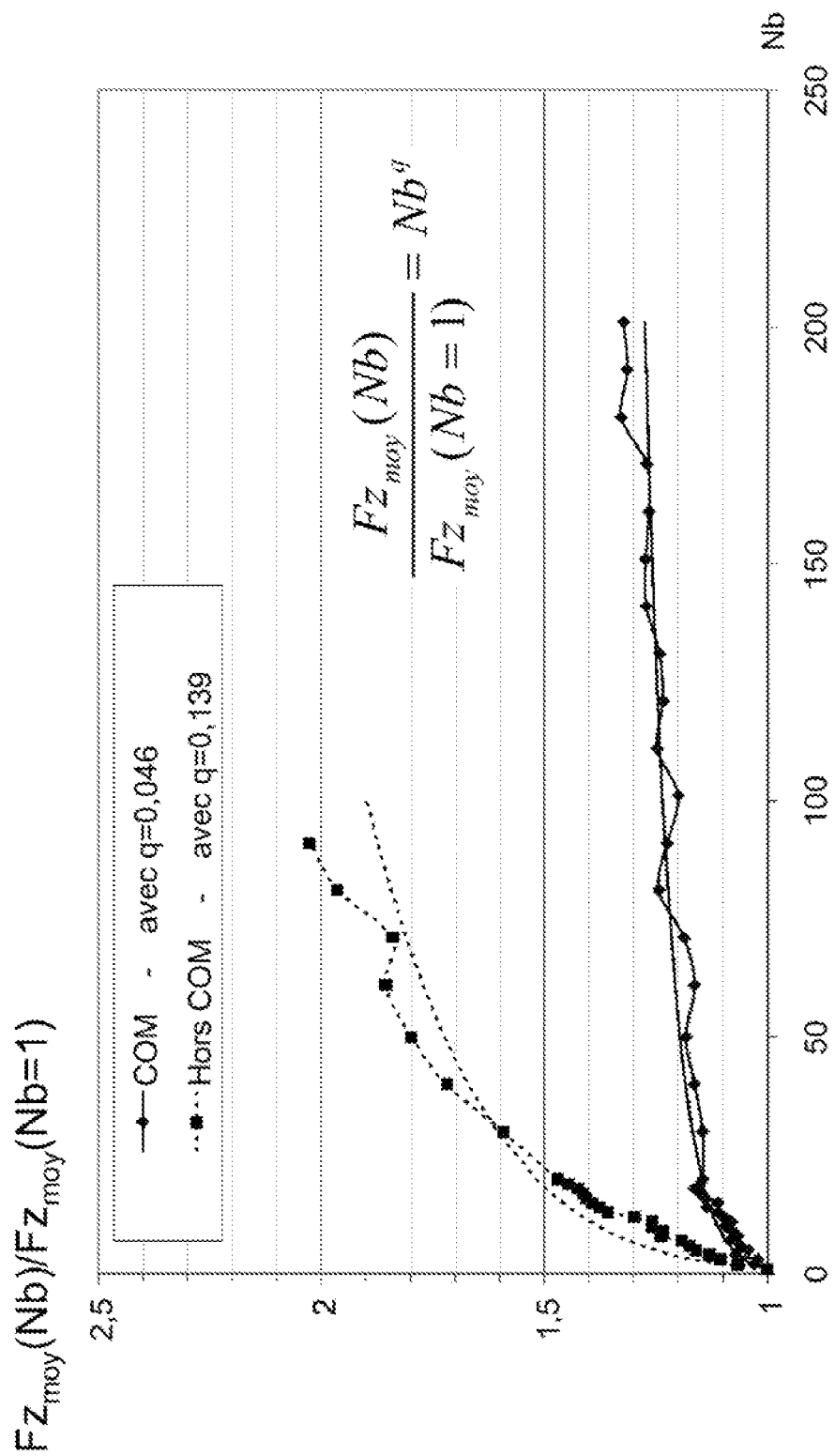
Figure 40:
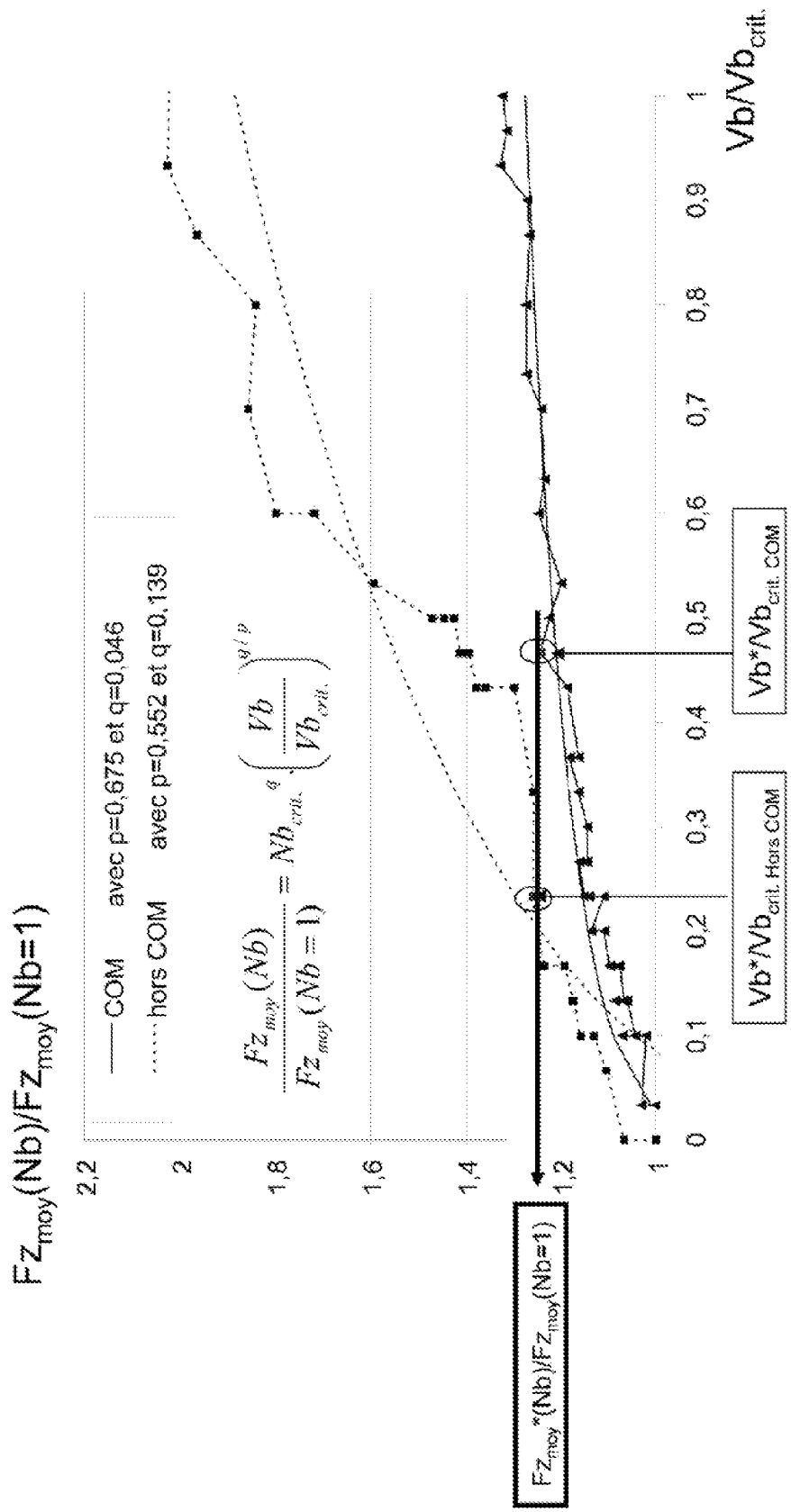
Figure 41:
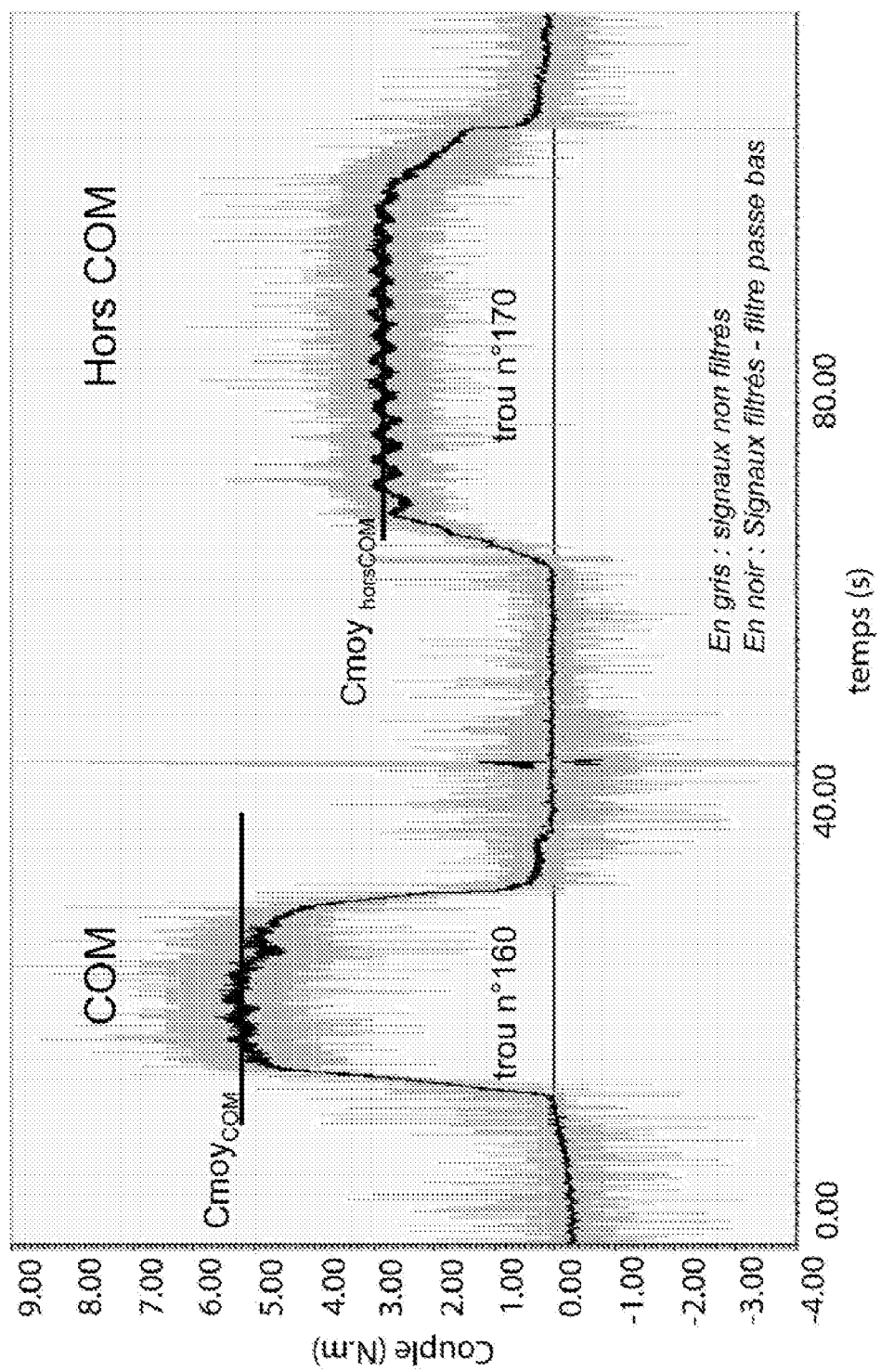
Figure 42:
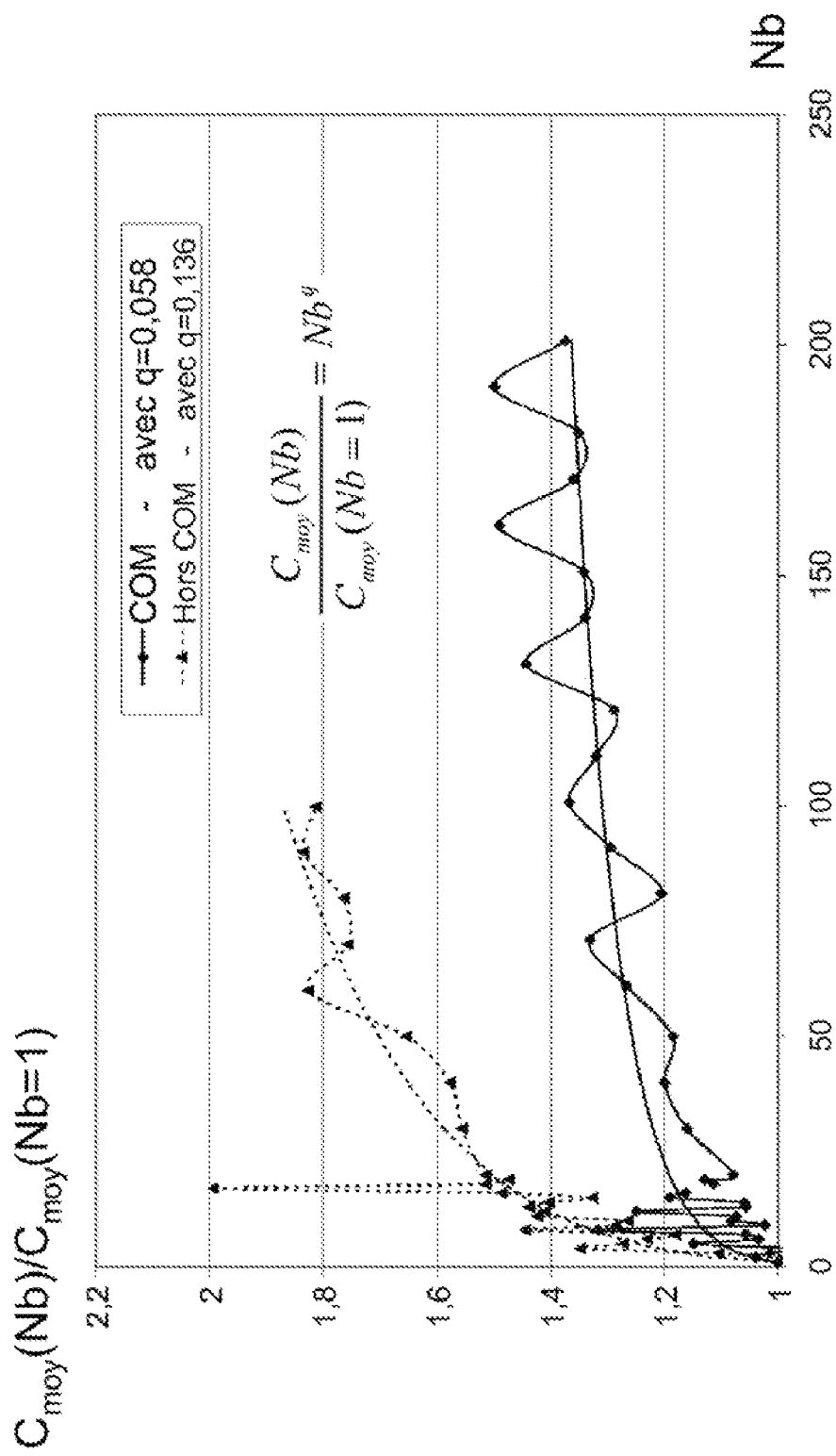
Figure 43:
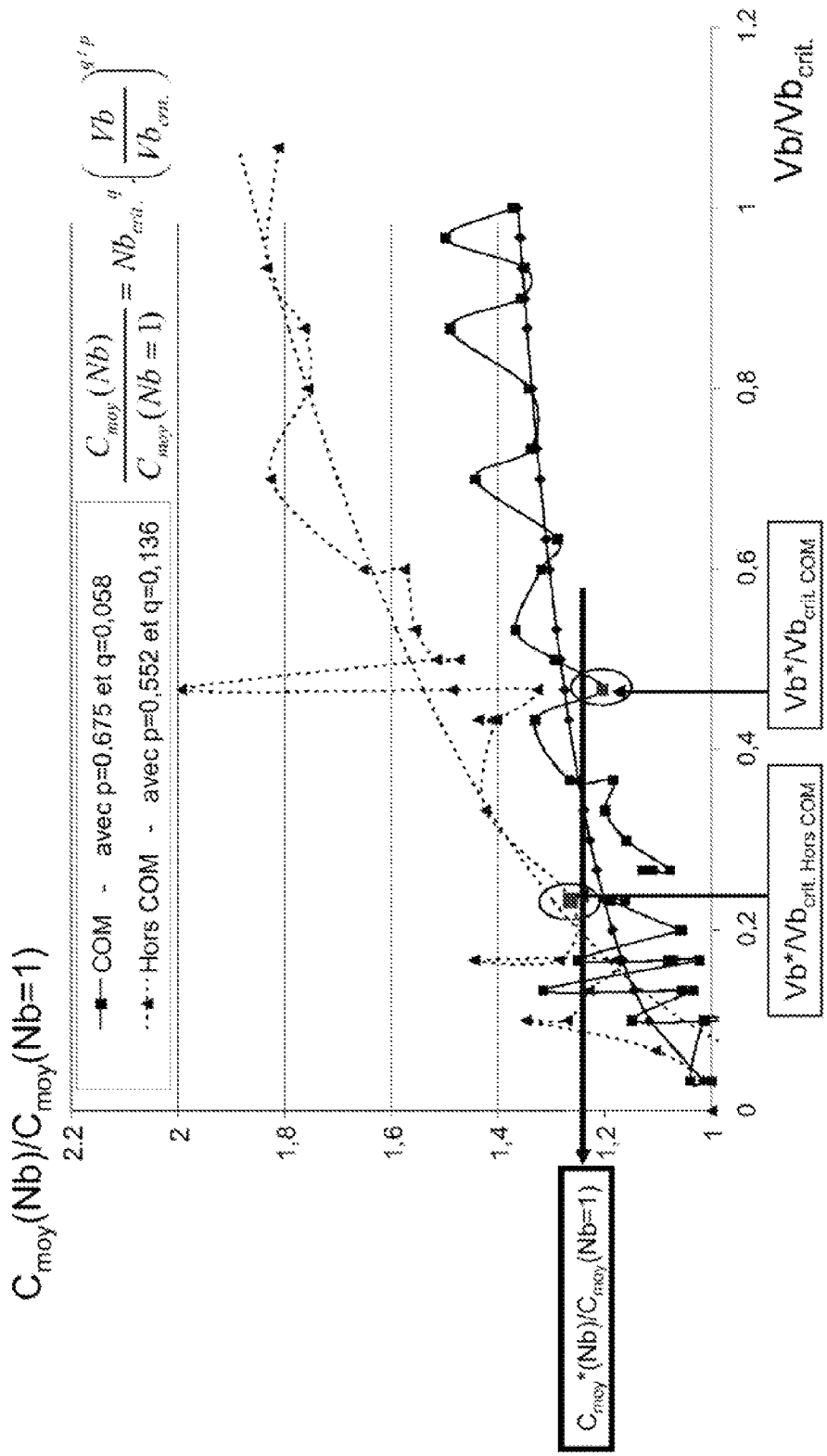

a MEB photograph 7b of the machining streaks spaced apart by half an advance and of a helical streak tilted with an angle β'; and a MO photograph 7c of the microstructural state at the edge of a bore with no anomaly, on which there is observed a very light cold hammered area;

FIG. 8 shows a typical half bore with a CCI, with a MEB mapping 8a illustrating a plurality of isolated chips, oriented in the direction perpendicular to the bore axis and evenly distributed from the inlet to the outlet of the bore;

a MO photograph 8b illustrating a poor adhesion of a chip isolated from a longitudinal cut of a typical bore with CCI;

a MO photograph 8c illustrating a CI being more or less stuck with a good adhesion at the surface of the bore;

a MO photograph 8d of the burr at the outlet of the typical bore with CCI;

FIG. 9 represents the variation over time of the stress Fz in the case of the CCI;

FIG. 10 represents the variation over time of the torque C in the case of the CCI;

FIG. 11 shows a typical half bore with a CCI+BMC, with a photograph 11a of the surface onto which there can be observed a plurality of helical streaks at the bore surface, oriented according to an angle β';

a MO photograph 11b from a longitudinal cut: photographs 11c, 11d, 11e and 11f are enlarged views in four distinct locations of the bore edge;

the MO photograph 11c illustrating a strip of a MC1 sheared material with an underlying strip of DP1 plastic deformation for a typical CCI+BMC bore;

a MO photograph 11d of the burr at the outlet of a typical bore with CCI+BMC;

a photograph 11e illustrates at the MO an isolated chip CI2 stuck on sheared material MC2, followed by a plastic deformation strip DP2;

a photograph 11f illustrates at the MO an isolated chip CI3 welded onto sheared material MC3, followed by a plastic deformation strip DP3;

FIG. 12 represents the variation over time of the stress Fz in the case of a typical bore with an anomaly combination (CCI+BMC);

FIG. 13 represents the variation over time of the torque C in the case of a typical bore with an anomaly combination (CCI+BMC);

FIG. 14 illustrates a typical bore with an anomaly combination CCI+BMC+ZATM with a photograph 14a of a longitudinal section: photographs 14b, 14c, 14d and 14e are enlarged views in four distinct places of the bore edge;

a photograph 14b illustrates at the MO an isolated chip CI4 stuck on sheared material MC4, followed by a plastic deformation area DP4;

a photograph 14c illustrates at the MO an isolated chip CI5 welded onto sheared material MC5, followed by a recristallized area ZR5;

the photograph 14d illustrates at the MO an isolated chip CI6 stuck in a ZATM6;

the photograph 14e illustrates at the MEB a ZATM located at the outlet of a typical bore CCI+BMC+ZATM;

the photograph 14f shows two photographs at the MO illustrating the ZATM shape from longitudinal sections: triangular ZATM (ZATMt7) and rectangular ZATM (ZATMr7);

the photograph 14g shows two photographs illustrating colour halos, at the inlet and the outlet of a typical CCI+BMC+ZATMr bore;

FIG. 15 represents the variation over time of the stress Fz in the case of a typical bore with an anomaly combination (CCI+BMC+ZATM);

FIG. 16 represents the variation over time of the torque C in the case of a typical bore with an anomaly combination (CCI+BMC+ZATM);

FIG. 17 is a diagram representing the $Fz_{max}/Fz_{threshold}$ ratio as a function of the drilling time tp in the case of a typical bore with CCI+BMC+ZATM;

FIG. 18 is a diagram representing E as a function of Vc in the form of a logarithmic scale in the case of a typical bore with CCI+BMC+ZATM;

FIG. 19 is a diagram representing the $ZATM_{max}$ measured as a function of the product $$\frac{Fz_{\max}}{Fz_{threshold}} \cdot tp$$

in the case of a typical bore with CCI+BMC+ZATM;

FIG. 20 is a diagram representing the $ZATM_{max}$ measured as a function of the maximum energy $Ec_{max}$ dissipated at the section deducted from the torque max $C_{max}$, of Vc, D and the drilling time tp, in the case of a typical bore with CCI+BMC+ZATM;

FIG. 21 is a curve representing the front wear Vb as a function of the number of bores being drilled for the COM cutting optimum condition and another outside COM cutting condition for which the first bore drilled with a new tool does not show any anomalies;

FIG. 22 is a curve representing $Vb/Vb_{crit.}$ as a function of $Nb/Nb_{crit.}$ for the COM cutting optimum condition and another outside COM cutting condition for which the first bore drilled with a new tool does not show any anomalies;

FIG. 23 is a master curve representing, for the COM condition and an outside COM condition, the standardized front wear $Vb*/Vb_{crit.}$ as a function of the standardized number of bores $Nb*/Nb_{crit.}$ corresponding to the occurrence of the anomaly into consideration for the tool/material assembly under study;

FIG. 24 is a record of typical PM signals of the stress Fz for the COM condition and an outside COM condition after a number Nb of bores being drilled and a front wear Vb of the drill bit for the tool/material assembly under study;

FIG. 25 is a diagram representing the $Fz_{moy}(Nb)/Fz_{moy}(Nb=1)$ ratio as a function of Nb for the COM condition and an outside COM condition;

FIG. 26 is a diagram representing the $Fz_{moy}(Nb)/Fz_{moy}(Nb=1)$ ratio as a function of the standardized wear $Vb/Vb_{crit.}$, for determining the detection criterion $Fz*_{moy}(Nb*)/Fz_{moy}(Nb=1)$ of the anomaly into consideration (CCI), independently from the cutting conditions and for the tool/material assembly under study;

FIG. 27 is an example of a record of the stress and the torque for a typical bore without any anomaly (AL Vc=8 m/min f=0.08 mm/round);

FIG. 28 is an example of a record of the stress and the torque for a typical bore with CCI (SL Vc=15 m/min f=0.02 mm/round);

FIG. 29 is an example of a record of the stress and the torque for a typical bore with CCI (SL Vc=20 m/min f=0.02 mm/round);

FIG. 30 is an example of a record of the stress and the torque for a typical bore with CCI+BMC+ZATM (SL Vc=55 m/min f=0.02 mm/round);

FIG. 31 is an example of a diagram representing the $Fz_{max}/Fz_{threshold}$ ratio as a function of the drilling time tp in the case of a typical bore with CCI+BMC+ZATM and for the WC-Co coated Tool/Inconel 718TR Material assembly;

FIG. 32 is an example of a diagram representing E as a function of Vc in a logarithmic scale in the case of a typical bore with CCI+BMC+ZATM and for the WC-Co coated tool/Inconel 718TR material assembly;

FIG. 33 is an example of a diagram representing values for $ZATM_{max}$ measured as a function of the product $$\frac{Fz_{\max}}{Fz_{threshold}} \cdot tp$$

in the case of a typical bore with CCI+BMC+ZATM and for the WC-Co coated tool/Inconel 718TR material assembly;

FIG. 34 is an example of a diagram representing values of $ZATM_{max}$ measured as a function of the maximum energy $Ec_{max}$ dissipated during the cutting operation deducted from the max torque $C_{max}$, Vc, D and the drilling time tp, in the case of a typical bore with CCI+BMC+ZATM and for the WC-Co coated tool/Inconel 718TR material assembly;

FIG. 35 is an example of a curve representing the front wear Vb as a function of the number of bores to be drilled for the optimum cutting condition AL Vc=8 m/min f=0.08 mm/round (COM) and another cutting condition AL Vc=15 m/min f=0.02 mm/round (outside COM) for which the first bore drilled with a new tool does not show any anomalies;

FIG. 36 is an example of a curve representing $Vb/Vb_{crit.}$ as a function of $Nb/Nb_{crit.}$ for the optimum cutting condition AL Vc=8 m/min f=0.08 mm/round (COM) and another cutting condition AL Vc=15 m/min f=0.02 mm/round (outside COM) for which the first bore drilled with a new tool does not show any anomalies;

FIG. 37 is an example of a master curve representing, for the condition COM AL Vc=8 m/min f=0.08 mm/round and for an outside COM condition AL Vc=15 m/min f=0.02 mm/round, the standardized front wear $Vb*/Vb_{crit.}$ as a function of the standardized number of bores $Nb*/Nb_{crit.}$ corresponding to the occurrence of the anomaly under consideration (CCI+BMC) for the tool/material assembly under study;

FIG. 38 is an example of a record of typical PM signals of the stress Fz for the COM condition AL Vc=8 m/min f=0.08 mm/round and an outside COM condition after a number Nb of bores being drilled and a front wear Vb of the drill bit for the tool/material assembly under study;

FIG. 39 is an example of a diagram representing $Fz_{moy}(Nb)/Fz_{moy}(Nb=1)$ as a function of Nb for the COM condition AL Vc=8 m/min f=0.08 mm/round and an outside COM condition AL Vc=15 m/min f=0.02 mm/round;

FIG. 40 is an example of a diagram representing $Fz_{moy}(Nb)/Fz_{moy}(Nb=1)$ as a function of the standardized wear $Vb/Vb_{crit.}$, for determining the detection criterion $Fz*_{moy}(Nb*)/Fz_{moy}(Nb=1)$ of the anomaly under consideration (CCI+BMC), independently from the cutting conditions and the WC-Co coated tool/Inconel 718TR material assembly;

FIG. 41 is an example of a record of typical PM signals of the torque C for the COM condition AL Vc=8 m/min f=0.08 mm/round and a outside COM condition AL V=15 m/min f=0.02 mm/round after a number Nb of bores being drilled and a front wear Vb of the drill bit for the tool/material assembly under study;

FIG. 42 is an example of a diagram representing $C_{moy}(Nb)/C_{moy}(Nb=1)$ as a function of Nb for the COM condition AL Vc=8 m/min f=0.08 mm/round and an outside COM condition AL Vc=15 m/min f=0.02 mm/round;

FIG. 43 is an example of a diagram representing $C_{moy}(Nb)/C_{moy}(Nb=1)$ as a function of the standardized wear Vb/Vb-crit., for determining the detection criterion $C^*_{moy}(Nb^*)/C_{moy}(Nb=1)$ of the anomaly under consideration (CCI+BMC), independent from the cutting conditions and for the WC-Co coated tool/Inconel 718TR material assembly.

Figure 3:
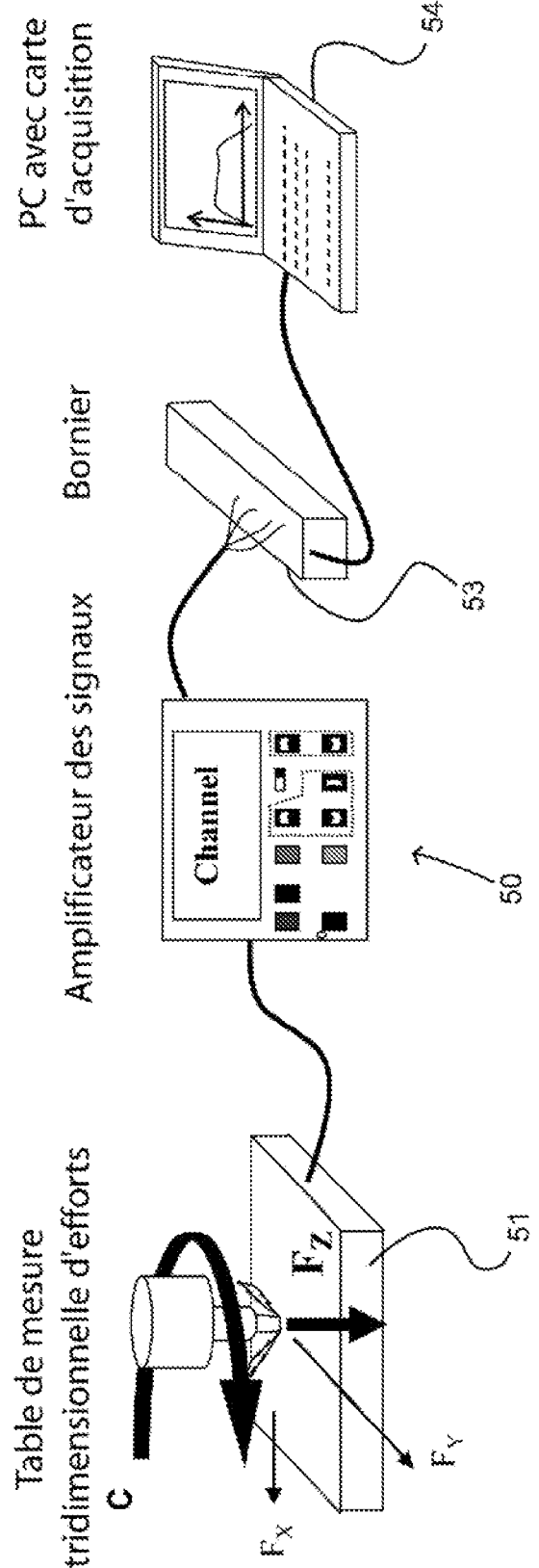
FIG. 3 illustrates the diagram of the stress Fz and C acquisition chain.

As can be seen on FIG. 3, as far as the acquisition chain 50 for signals Fz and C is concerned, the axial penetration stress parameters (Fz) of the drill bit 10 into the material 4 and the torque (C) deducted from the transversal stresses are recorded as a function of time by means of an acquisition chain. The latter is provided with a three dimension stress measuring table 51, provided with piezoelectric sensors, onto which the vice 5 and the part 4, not shown here, are secured. Such sensors record representative signals for transversal stresses (Fx, Fy) and for the axial stress (Fz), thereafter, these signals are amplified in 52. Once the amplification is achieved, signals are sampled by an acquisition board (terminal) 53, connected with a microcomputer 54. A signal acquisition software then allows to implement various treatments in order to facilitate the time analysis of the cutting stresses, such as, for example, filtering signals Fz and C with a low-pass filter. The torque C generated by the drill bit 10 on the part is a linear combination of transversal stresses Fx and Fy. At a point M of the measuring table, as defined by the coordinates thereof, x and y, the torque is obtained by the following relationship: $C=C_0+x \cdot Fy - y \cdot Fx$ where $C_0$ is the torque value at the point (x=0 and y=0).

Figure 4:
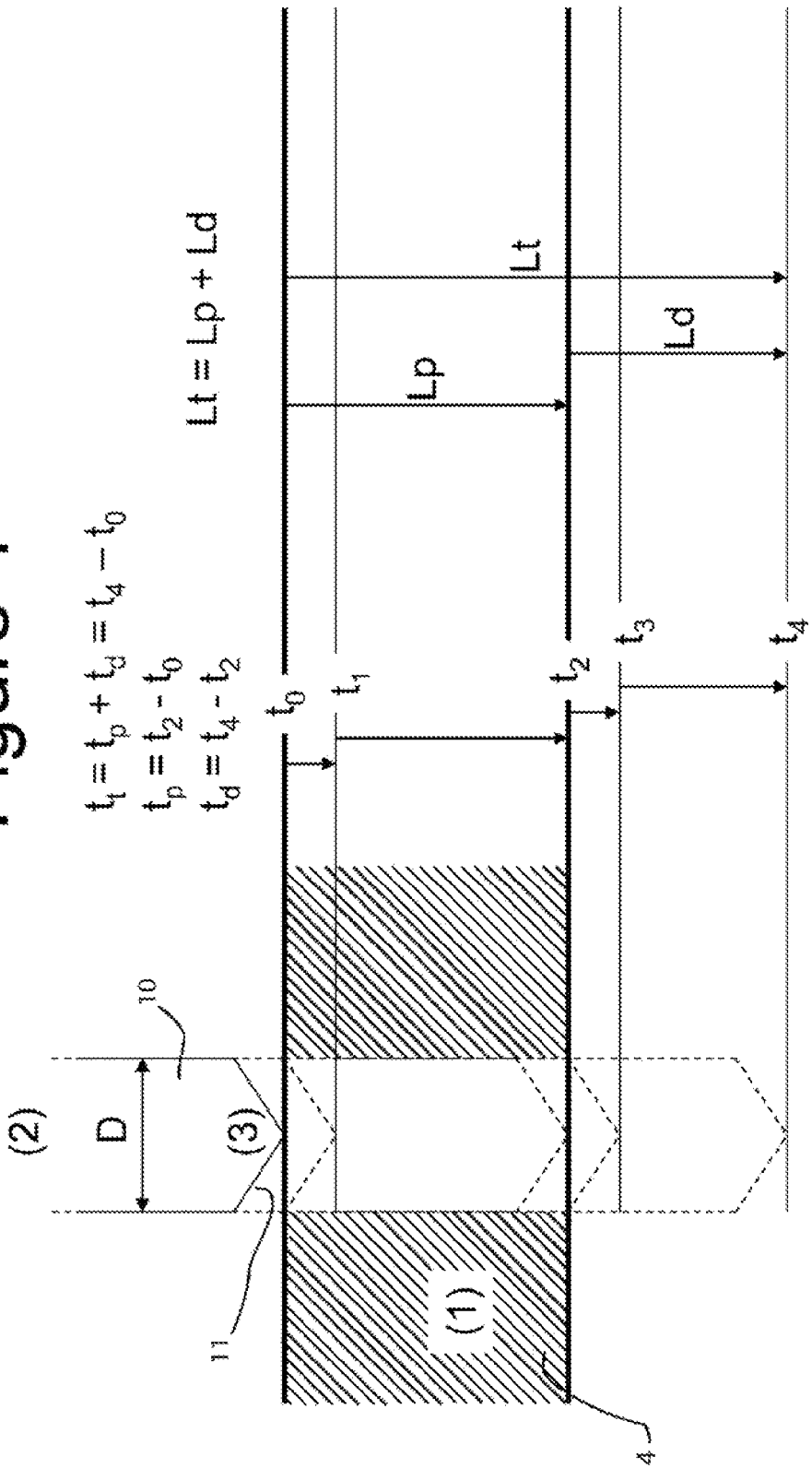
FIG. 4 illustrates the different drilling steps and the geometrical parameters associated to drilling.

FIG. 4 illustrates the different steps of a drilling operation for perforating a metal plate 4 with a thickness Lp. The drill bit 10, having a diameter D with a frustoconical tip 11 is positioned in contact against the part on time $t_0$. The successive time periods up to time $t_4$ indicating the end of the deburring operation are as follows:

$t_1-t_0$: entry of the drill bit tip 11,
$t_2-t_1$: drilling phase by the drill bit noses 12,
$t_3-t_2$: outlet of the drill bit tip 11,
$t_4-t_3$: friction of the lists 14 at the bore surface right before the drill bit goes up,
$t_2-t_0$: drilling phase with a drilling length Lp without deburring the tip 11,
$t_3-t_0$: bore drilling with tip deburring 11,
$t_4-t_2$: drill bit deburring on the length Ld right before the latter goes up.

The optimum cutting parameters, including the circumferential rate (Vc) and the progression rate per round (f) for a given drill bit and a given material range within a narrow field as defined by the tool-material assembly method (AFNOR NF E 66-520-8 method). Such a so-called operating field maximizes the useful life of the drill bit while minimizing the specific cutting stresses Kca and Kct. It systematically corresponds to the total absence of anomalies. It is to be noticed that the field with no anomaly as defined for a new drill bit per bore is much larger than the drill bit operating field (COM). However, an anomaly type systematically occurs from a number of bores Nb* much lower than that corresponding to the rake wear criterion ($Vb_{crit.}$=0.3), resulting in the drill bit being rejected. Thus, it seems that COM preserves the drill bit better than the material. Indeed, the field with no anomaly is reduced, or even disappears, depending on the extent of the rake wear of the drill bit edges and this well before the drilling bit is rejected.

A test matrix is implemented so as to vary in a large range the torque parameters (Vc, f) and the geometrical parameters of the bore (Lp, D). In addition to the cutting conditions, significantly remote from the optimum conditions resulting from the AFNOR NF E 66-520-8 method, drilling SL is being considered with equally drastic cutting conditions (for example, up to 10 times the optimum cutting rate and ⅕ of the optimum progression rate) in order to better enhance generating anomalies. This way, each bore has been drilled with a new drill bit (Vb=0) so as to ensure a good reproducibility of the anomalies.

Figure 5:
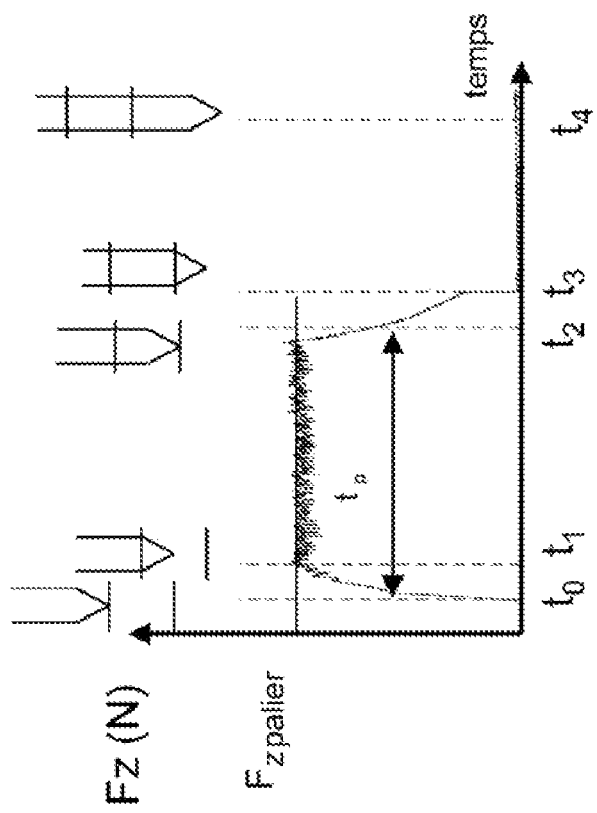
FIG. 5 is an illustration of the variation over time of the axial stress Fz for a bore with no anomaly.
Figure 6:
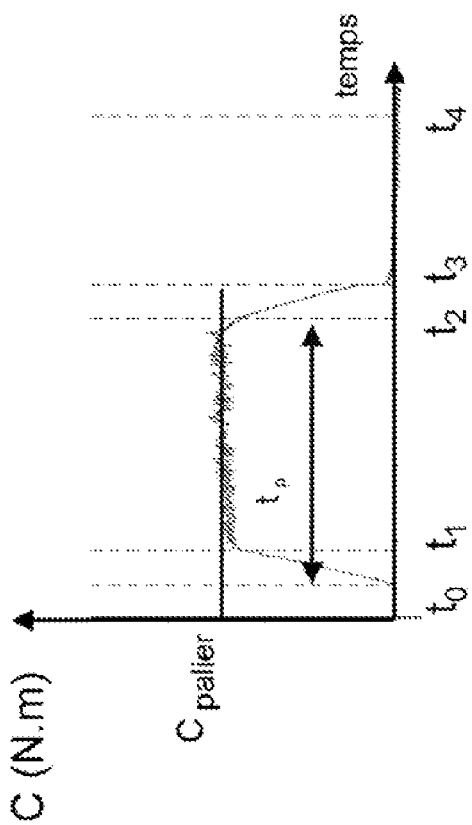
FIG. 6 is an illustration of the variation over time of the torque C for a bore with no anomaly.

In the case of a drilling operation being implemented without any anomalies, it has been found that, for a given drill bit and a given material, the torque C generated by the drill bit and the axial penetration stress Fz of the drill bit into the material show a stationary rate (values independent from time) during the drilling phase by the drill bit noses, between times $t_1$ and $t_2$. FIGS. 5 and 6 illustrate the variation of such parameters as a function of time.

In the case of a bore with no anomaly, a longitudinal section shows that:

Machining streaks are regularly spaced apart by half an advance distance (drill bit with two noses) or an advance distance (drill bit with one single nose), and are tilted with an angle near 0° compared to an axis perpendicular to the bore axis (FIG. 7a);

Shallow helical streaks are produced by noses when the drill bit goes up (FIG. 7b) and are tilted with an angle β';

The metallurgic condition of the bore is not thermally affected (FIG. 7c); there could optionally be observed a very slight cold hammering on the surface being coupled with residual stresses;

No micro-hardness variation is observed at the bore edge;

The bore roughness is normal, i.e., representative of the depth of machining streaks for the advance rate under consideration;

The bore side surface and the inlet and outlet side thereof have an unmodified colour, indicating the absence of oxidation and a significant temperature increase at the bore edge;

The burr, indicating some material forcing back, is practically non existing both at the outlet as well as at the inlet of the bore.

It has been found out that anomalies could be detected as being generated at the bore edge from the shape of the variation curves of Fz and C during the drilling operation. The severity of such anomalies depends on the evaluation of criteria and by their position ranging from a lower limit to a higher limit.

Should this be the case, the surface under the signal curve is determined during the drilling operation.

A set of additional values (tp, td, $t^*_{Fz=0}$ and $t_3^*$) is recorded on the signals, in order, on the one hand, to check the programming accuracy of the cutting parameters (Vc, f), and, on the other hand, to find, through calculation, some geometrical features of the bore (β', Lb).

Destructive trials, being inevitable for indicating the severity of such anomalies, comprise a metallographic analysis of longitudinal sections of typical bores. The correlations between microstructural states, the typology of signals Fz and C, the $Fz_{max}/Fz_{threshold}$, $C_{max}/C_{threshold}$ ratios or, should this be the case, the $Area_{Fzmax}/Area_{Fzthreshold}$, $Area_{Cmax}/Area_{Cthreshold}$ ratios and their variation fields between a lower limit and a higher limit result in classifying and quantifying the anomalies according to three types.

It has been found out that the $C_{max}/C_{threshold}$ ratio was the most significant for characterizing any anomaly type. Nevertheless, the $Fz_{max}/Fz_{threshold}$ ratio allows for the damage to the drill bit generated during a drilling operation to be indicated, and this, in the field of severe anomalies (burns). For any anomaly type (CCI, BMC and ZATM), the $C_{max}/C_{threshold}$ ratio increases when Vc increases and f decreases. Only the maximum thickness of the thermo-mechanically affected area, $ZATM_{max}$, could be clarified as a function of cutting parameters and geometrical parameters of the bore:

$$ZATM_{max} = B \cdot (A' \cdot V_c^{n-2} \cdot L_p^2 \cdot D^2 \cdot f^{-2})^\alpha$$

The severity criterion as defined by the $ZATM_{max}$ thickness could also be expressed as a function of the maximum energy $Ec_{max}$ dissipated during the cutting operation deducted from the max torque $C_{max}$, from Vc, from D and from the drilling time tp:

$$ZATM_{max} = F \cdot \left( \frac{10^3 \cdot C_{max} \cdot V_c}{30 \cdot D} \cdot tp \right)^\lambda - G \text{ with } Ec_{max} = \frac{10^3 \cdot C_{max} \cdot V_c}{30 \cdot D} \cdot tp$$

Description of the First Typical Bore with CCI

Figure 8B:
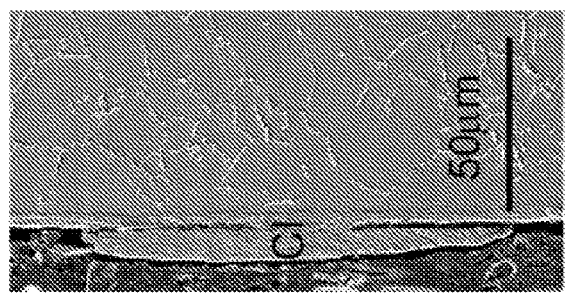
Figure 8C:
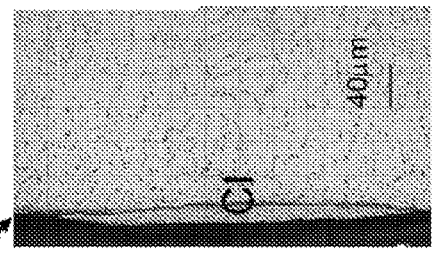
Figure 8D:
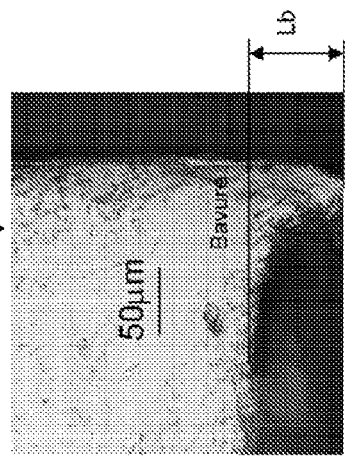
Figure 8A:
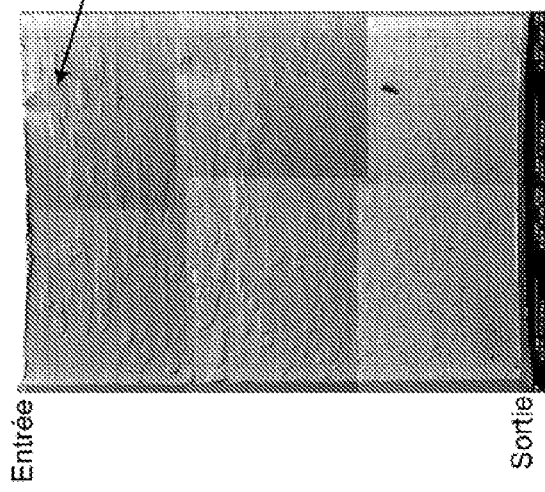

Such a first typical bore comprises an anomaly referred to as isolated chip gluing (CCI). The observations of a large number of samples made it possible to define the features of such anomaly type:
   Isolated chips (CI) are welded onto the surface of the part bore 4 and oriented in a direction perpendicular to the bore axis (FIG. 8a);
   Roughness is important;
   No colouration and hence, no oxidation has been observed at the bore surface and on the inlet and the outlet sides, indicating a gentle increase of the temperature at the bore edge;
   The adhesion of isolated chips is variable (FIG. 8b);
   The chips are more or less stuck into the material (FIG. 8c);
   The bore metallurgy is not thermally affected; however, a small cold hammered area is present at the bore surface, coupled with residual stresses;
   No micro-hardness variation in the material thickness is detected;
   The burr is very insignificant at the bore outlet (FIG. 8d) and absent at the bore inlet.

The generation of such anomaly type is hard to detect and to quantify by signals Fz and C. For some tool/material assemblies, and/or for some initial tool rake wear, stresses could more or less enhance such anomaly type. Generally, variations over time of parameters Fz and C corresponding to CCI have an appearance such as shown on FIGS. 9 and 10, and the following observations could be carried out:
   The axial stress has a stationary rate as defined by $Fz_{threshold}$. Sometimes, a slight decrease of the parameter Fz could be observed between $t_1$ and $t_2$, that seems to indicate a temperature increase lowering the elasticity threshold of the material to be machined;
   For the torque, and after a threshold has been established, ($C_{threshold}$) the latter shows slight fluctuations as from tc*, a little before $t_2$, and this applies until the cutting edges emerge at $t_3$. Such slight torque increase from tc* is due to a satisfactory temperature increase at the end of the drilling operation enhancing on the one hand, the binding between the drill bit and the bore, and, on the other hand, gluing a large quantity of badly removed chips.
   If the torque increase would have occurred much earlier between $t_1$ and $t_2$, there would be most likely observed the formation of a BMC, even of a ZATM (those two other anomaly types are disclosed herein below), in addition to CCI.

Gluing of isolated chips is therefore detectable from the variation range of the $[C_{max}/C_{pthreshold}]_{CCI} > 1$ ratio and a $[Fz_{max}/Fz_{threshold}]_{CCI} = 1$ ratio. The CCI abundance depends on the evaluation of the $C_{max}/C_{threshold}$ (or areas) ratio being the severity criterion of the CCI. The chip recovery rate at the side surface of the bore increases when the $C_{max}/C_{threshold}$ ratio increases.

Description of the Second Typical Bore with CCI+BMC

Such a typical bore is characterized by highly sheared and mixed material strip, referred to as BMC, sometimes coupled with the CCI anomaly. Such a BMC results from a mixing operation between the surface material of the bore and a high concentration of isolated chips. Such a material assembly is then forced back at the bore surface during the cutting operation, then smoothed by the lists when the drill bit goes up.

Figure 11A:
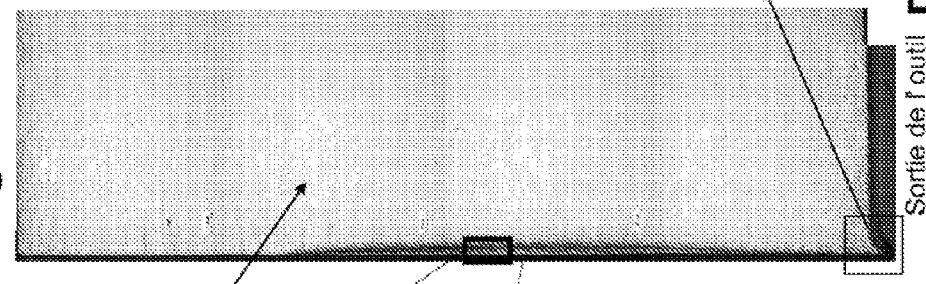
Figure 11B:
Figure 11C:
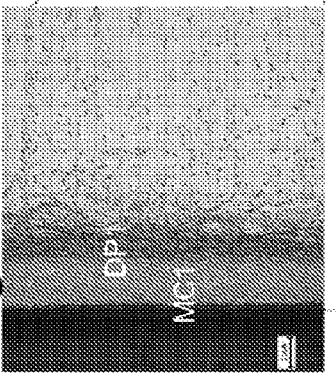
Figure 11D:
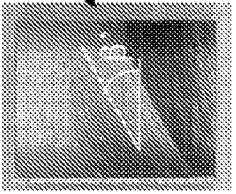

The observations on a longitudinal section of the bore made it possible to define the following features of such an anomaly type:
   A plurality of helical streaks at the BMC surface, generated by the lists when the drill bit goes up, and tilted according to a angle β' (FIG. 11a);
   A colouration change at the side surface of the bore, indicating some oxidation (FIG. 11a);
   A very weak roughness due to the material spreading during the drilling stage and while the drill bit goes up;
   A partial or total height of the side surface of the bore is affected by the formation of such sheared material strip (FIGS. 11a and 11b). Such a BMC is coupled to an underlying strip of plastic deformation (BDP) characterized by a hardness increase in the underlying layer, resulting from the forcing back of chips by the drill bit lists during the cutting operation (FIG. 11c);
   No metallurgic change behind the BDP has been observed;
   A burr at the bore outlet with a larger extent than for CCI (FIG. 11d).

Practically, such a BMC anomaly type is most often associated to a stuck CCI type anomaly (FIG. 11e) or of the welded type (FIG. 11f) of such a BMC (notion of anomaly combination).

FIG. 12 and 13 illustrate, in this case, the variation over time of parameters Fz and C. There are observed:
   The establishment of a stationary rate in axial stress between $t_1$ and $t_2$, and, sometimes a slight decrease of such a stress due to a temperature increase and hence, to an elasticity limit decrease;
   A strong gradual increase of the torque as from tc*, a little before $t_2$, and up to a maximum near $t_3$ where the drill bit cutting edges emerge;
   Metallurgic analyses showed that tc* does not correspond to the start of the BMC in the bore depth. Indeed, the high material shear essentially occurs at right angle with the cut. Depending on the severe drilling conditions being considered, this shearing phenomenon results in a more or less fast temperature increase. Once it has reached a threshold temperature at tc*, the torque increase could be explained by the intensification of two concurrent phenomena already disclosed for the typical bore with CCI: on the one hand, the higher binding between the drill bit and the bore, and on the other hand, chips being significantly glued at the bore surface;
   Smoothing all the sheared material at the bore surface forming the BMC seems to occur during the deburring phase of the drill bit body between $t_3$ and $t_4$.

If the torque increase would have occurred much earlier between $t_1$ and $t_2$, there could be certainly observed the formation of a ZATM (such an anomaly is presented hereinbelow) in addition to CCI+BMC.

The CCI+BMC anomaly combination is detectable from the variation range of the $[C_{max}/C_{threshold}]_{CCI+BMC} > [C_{max}/C_{threshold}]_{CCI} > 1$ ratio and a $[Fz_{max}/Fz_{threshold}]_{CCI+BMC} = 1$ ratio. As for gluing isolated chips, the quantification of such an anomaly type is measured by the $C_{max}/C_{threshold}$ ratio or should this be the case, by the area ratio. The height of such a sheared material strip at the side surface of the bore increases as the $C_{max}/C_{threshold}$ ratio increases.

Description of the Third Typical Bore with CCI+BMC+ZATM

Such a third typical bore is affected by anomalies CCI, BMC, but also by a third typical anomaly, referred to as the thermo-mechanically affected area, ZATM.

Figure 14E:
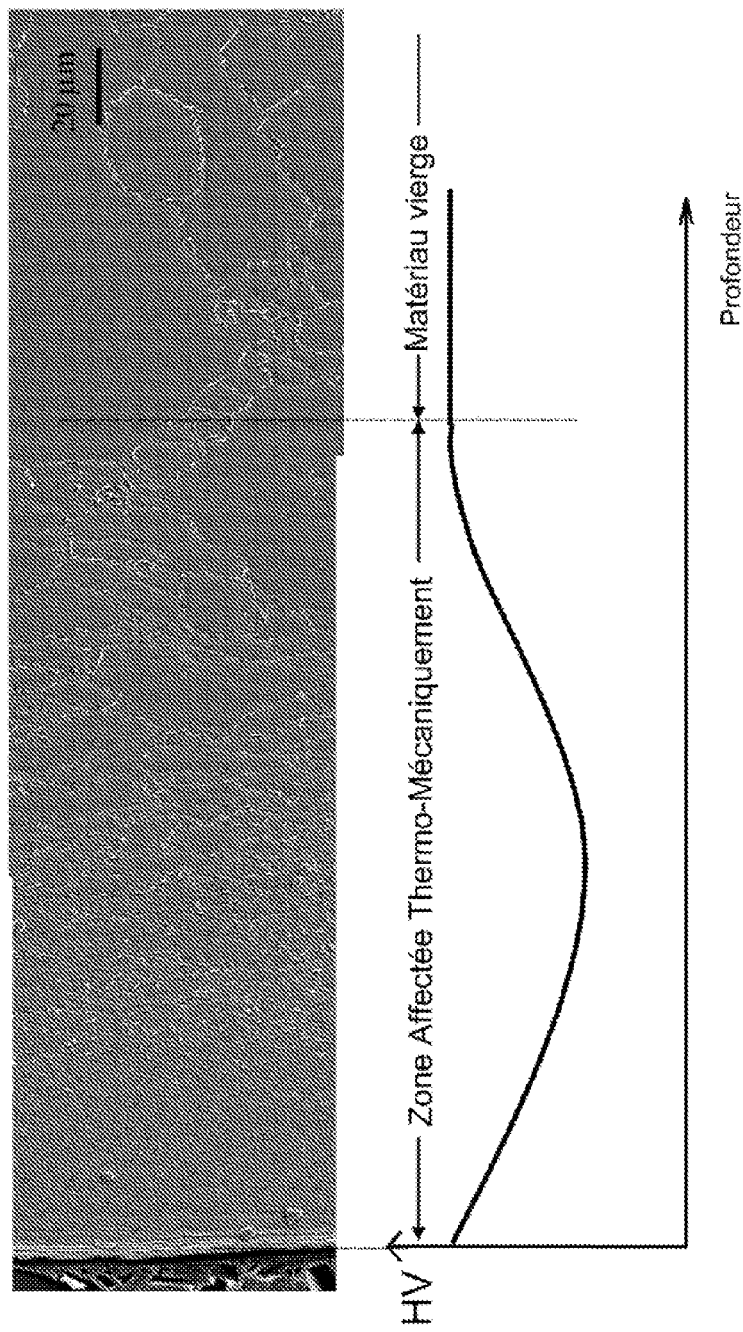

FIG. 14 shows a longitudinal cut of a bore drilled in the part 4 wherein type anomaly types are present and were enlarged on FIGS. 14b, 14c, 14d and 14e.

Figure 11E:
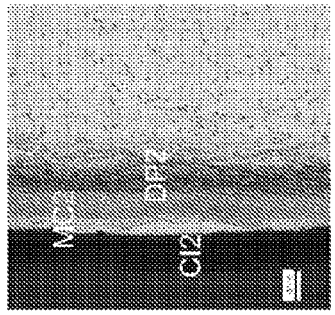
Figure 11F:
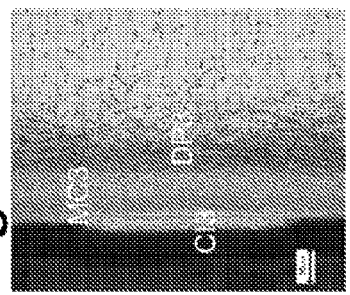

The combinations of anomalies CCI and BMC represented on FIGS. 14b and 14c are of the same type as that observed in typical CCI+BMC bores (FIGS. 11e and 11f).

There is sometimes observed a combination of CCI+ZATM anomalies. FIG. 14d illustrates a ZATM wherein an isolated chip is stuck.

FIG. 14e illustrates a thermo-mechanically affected area, ZATM, located at the bore outlet. It is characterized by a "V" shaped hardness profile, i.e. a decrease of the hardness from the bore edge up to the half depth of the ZATM, followed by an increase on the second half of the depth until the hardness of the virgin material is found again.

Figure 14F:
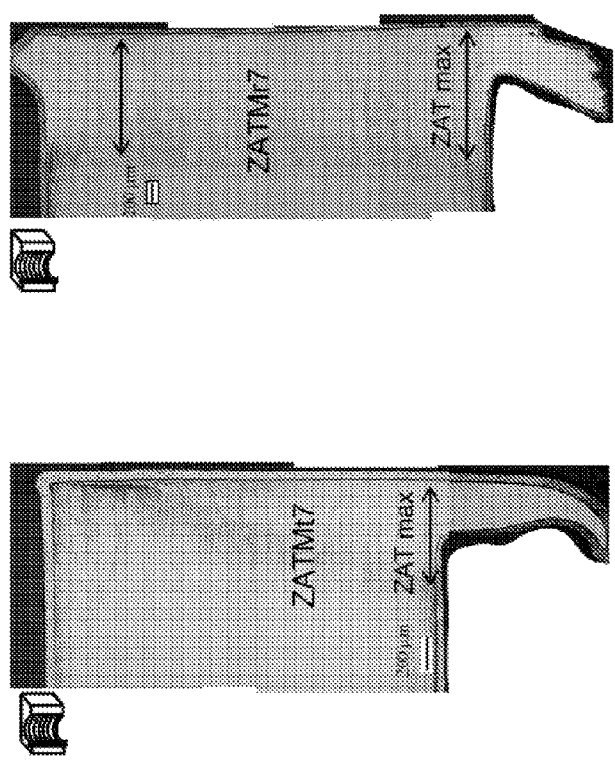
Figure 14G:
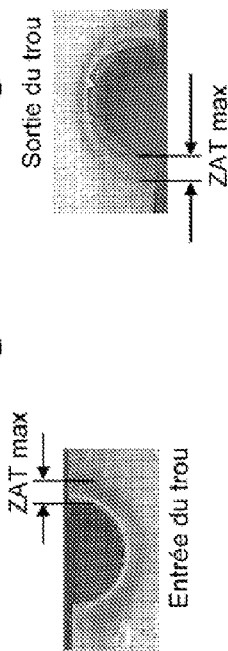

Two ZATM shapes can be observed: a triangular shape (ZATMt) or a rectangular shape (ZATMr), as illustrated on FIG. 14f. Such ZATM shapes are influenced by the Lp/D ratio.

More generally, a ZATM is detected by following phenomena:

On the inlet and the outlet sides of the bore, colour halos in the form of rings can be observed for the ZATMr (FIG. 14g), and only on the outlet side for the ZATMt. The diameter of said halos is equal to $D+2, ZATM_{max}$.

Such colour halos are coupled to a high material forcing back (burr) at the outlet and sometimes, even at the inlet of the bore. The burr at the bore outlet could be continuous, with a low thickness or discontinuous/fragmented with a high thickness (FIG. 14f). The presence thereof is detectable on signal Fz and in particular the length thereof is defined between $t^*_3$ and $t^*_{Fz=0}$ corresponding to the null load return of the stress. In the vicinity of the bore outlet, in severe drilling conditions, the drill bit extrudes more material then it cuts, because of a high material temperature increase (associated to a lowering of the mechanical properties thereof) and some damage to the drill bit noses (of the peeling off type and thermal fatigue) even a modification of its geometry.

All such metallurgic and geometrical features clearly distinct such a anomaly combination from the above mentioned one, CCI+BMC, showing a limited material forcing back, without any colour halo on the inlet and outlet sides of the bore, and a weak damage to the drill bit.

On FIG. 15 and 16, there is illustrated the time variation of parameters Fz and C for the typical bore with the combination of CCI+BMC+ZATM anomalies. There are observed:

The establishment of a stationary rate in axial stress, that sometimes slightly decreases as a result of the lowering of the elasticity limit of the material to be machined, as a result of the temperature increase, and this up to $t^*_{Fz}$;

$t^*_{Fz}$ does not correspond to the position at the start of the ZATM in the bore depth but rather indicates the start of some wear of the drill bit. Beyond $t^*_{Fz}$, the stress shows a progressive increase, or a succession of small plateaus followed by a sharper increase. Such a set of events shows a strong damage to the cutting edges, and hence, how difficult it is for the drill bit to machine the material;

The stress maximum $Fz_{max}$ occurs a little before $t_2$ i.e. before the cutting edges emerge. Indeed, as it comes nearer to the outlet, the drill bit becomes hotter and the more the resistance and the thickness of the material under the drill bit decrease, and hence, the more the stress that the drill bit should exert for deforming the material decreases (formation of the burr);

The $Fz_{max}/Fz_{threshold}$ ratio indicates the damage to the drill bit;

Checking the tool damage involves comparing the theoretical time $t_3$, the time where the drill bit noses emerge, to that experimentally recorded $t^*_3$ on the stress signal Fz. It has been found that in the case of severe burns, with a high drill bit damage, such a theoretical time $t_3$ is systematically lower than the experimental time $t^*_3$. Indeed, the drill bit noses being highly damaged (geometry loss), the largest drill bit section is no longer located at the level of the noses but above;

The length of the burr at the outlet could be determined repeating the time between $t^*_3$ and $t^*_{Fz=0}$;

The torque starts with a very short threshold up to tc*, then continuously increases until it reaches, a little before $t_2$, a maximum corresponding to the stress maximum;

As opposed to the two other typical bores CCI and CCI+BMC, such a typical bore CCI+BMC+ZATM shows a tc* much earlier between $t_1$ and $t_2$, and the involved phenomena are of the same nature, but much more amplified. Indeed, the temperature increase seems having occurred much faster, as a result of the very poor cutting conditions. The increase speed of the torque up to $C^*_{Fz}$ seems to indicate on the one hand, a much higher binding between the drill bit and the bore for such a typical bore than for both other typical bores, and, on the other hand, a very strong mixing of material between the surface and a large amount of chips. Sometimes, such a temperature increase is visible through a stress decrease up to $t^*_{Fz}$ (before the drill bit becomes damaged), as a result of a decrease of the elasticity limit of the material to be machined;

At $t^*_{Fz}$, the torque reaches a value $C^*_{Fz}$ beyond which the increase rate of the torque varies as a result of the poor cutting quality;

The torque falls less drastically between $t_3$ and $t_4$, for this typical bore than for the typical bore CCI+BMC. This indicates a strong friction of the lists on the bore and a slower cooling down of the tool/material assembly that could have consequences on the thermal cycle undergone by the part, and hence, on the ZATM.

As opposed to the typical bore with CCI and to the typical bore with CCI+BMC, the third typical bore with CCI+BMC+ZATM could be detected with the torque and/or the axial stress, from the variation range of the $[C_{max}/C_{threshold}]_{CCI+BMC+ZATM} > [C_{max}/C_{threshold}]_{CCI+BMC} > 1$ ratio and a $[Fz_{max}/Fz_{threshold}]_{CCI+CCC+ZATM} > 1$ ratio.

Determination of $ZATM_{max}$ from the Analysis of the Axial Stress

According to another feature of the invention, a severity criterion is established for said third typical bore expressing the maximum value of the thickness of the ZATM as a function of the geometrical parameters (Lp, D) and of the cutting conditions (Vc, f).

Such a critical thickness of ZATM is calculated by the following formula:

$$ZATM_{max} = B.(A'.V_c^{n-2}.L_p^2.D^2.f^{-2})^\alpha$$

Parameters A', B, α and n are constants intrinsic to the tool/material assembly that should be determined.

Hereinafter is described a 4-step approach for identifying such 4 constants A', B, α and n associated to the tool/material assembly under consideration.

Step 1: The $Fz_{max}/Fz_{threshold}$ ratio is plotted as a function of the drilling time tp measured or calculated by the relationship:

$$tp = \frac{60 \cdot \pi \cdot Lp \cdot D}{1000 \cdot Vc \cdot f}$$

the $Fz_{max}/Fz_{threshold}$ ratio could then have the following form (FIG. 17):

$$\frac{Fz_{max}}{Fz_{threshold}} = E \cdot tp \quad (1)$$

The slope E of the line directly depends on Vc through the relationship:

$$E = A.60^{-n}.V_c^n \quad (2)$$

Step 2: Constants A and n are determined plotting E as a function of Vc on a logarithmic scale (FIG. 18):

$$\ln E = n.\ln V_c + \ln(A.60^{-n})$$

Step 3: Constants B and α are determined plotting the experimental values of the $ZATM_{max}$ as a function of the product $$\frac{Fz_{max}}{Fz_{threshold}} \cdot tp$$

and approximating them through a power law of the type (FIG. 19):

$$ZATM_{max} = B \cdot \left(\frac{Fz_{max}}{Fz_{threshold}} \cdot tp\right)^\alpha \quad (3)$$

Step 4: Relationships (1), (2) and (3) are combined, in order to express the severity criterion based on the thickness of the $ZATM_{max}$ as a function of the geometrical parameters (Lp, D) and the cutting parameters (Vc, f).

$$ZATM_{max} = B.(A'.V_c^{n-2}.L_p^2.D^2.f^{-2})^\alpha$$

with $A' = A.(10^{-6}.60^{2-n}\pi^2)$

Determination of the $ZATM_{max}$ Based on the Torque Analysis

As a complement to the severity criterion built from the signal Fz, another criterion is determined from the torque. The latter involves expressing the thickness of $ZATM_{max}$ measured as a function of the maxium energy $Ec_{max}$ dissipated during the cutting operation deducted from the torque $C_{max}$, from Vc, from D and from the drilling time tp calculated or measured (FIG. 20):

$$ZATM_{max} = F \cdot \left(\frac{10^3 \cdot C_{max} \cdot V_c}{30 \cdot D} \cdot tp\right)^\lambda - G \text{ with } Ec_{max} = \frac{10^3 \cdot C_{max} \cdot V_c}{30 \cdot D} \cdot tp$$

and λ, F and G being three intrinsic constants of the tool/material assembly under consideration.

Area Analysis

Said analysis involves calculating areas under the curves Fz(t) and C(t) indicating thereby all the drilling history of the same bore or of a series of bores drilled with the same tool.

It applies in particular to the two following cases:
When the signals Fz and C of any anomaly are different from the above described ones (unobservation of a threshold value and/or a maximum value);
When the $C_{max}/C_{threshold}$ ratios and/or $FZ_{max}/FZ_{threshold}$ are identical for two identical typical bores, then the severity of the anomaly is different;
When the signals Fz and C show an amplitude increase on several bores drilled under constant drilling conditions.

Hereinbelow, the expression of the areas from the signal Fz being directly adapted to signal C:
the area under the curve Fz (t) from $t_0$ to $t_4$ for a Fz lower or equal to $Fz_{threshold}$ corresponds to the absence of anomaly, i.e.

$$Area_{Fzthreshold} = \int_{t0}^{t4} (Fz(t) \leq Fz_{threshold}) dt;$$

the area under the curve Fz(t) for a Fz ranging from $Fz_{max}$ to $Fz_{threshold}$ indicates the presence of anomalies, i.e.

$$Area_{Fzmax} = \int_{t0}^{t4} Fz(t) dt - Area_{Fzthreshold};$$

the area under the curve Fz(t) for Nb=1 corresponds to the absence of anomaly and tool wear, i.e.

$$Aire_{Fzmoy}(Nb = 1) = \int_0^4 Fz_{Nb=1}(t) dt;$$

the area under the curve $Fz_{Nb}(t)$ corresponds to a tool wear with or without the presence of anomaly(s) after a number Nb of bores being drilled, i.e $$Aire_{Fzmoy}(Nb) = \int_0^4 Fz_{Nb}(t) dt.$$

Then, there are calculated on the one hand, $Area_{Fzmax}/Area_{Fzthreshold}$ and/or $Area_{Cmax}/Area_{Cthreshold}$ area ratios for quantifying the anomaly severity during a drilling operation of a bore and on the other hand, the $Area_{Fzmoy}(Nb)/Area_{Fzmoy}(Nb=1)$ and/or $Area_{Cmoy}(Nb)/-Area_{Cmoy}(Nb=1)$ area ratios for quantifying the anomaly severity during the drilling operation of a series of bores.

Effect of the Wear in Vb of the Drill Bit on the Detection of a Typical Anomaly From PM, a detection criterion is established for a typical anomaly, as a result of a rake wear of the drill bit and this, for lack of being able to detect it using the signal shape.

For cutting conditions (Vc,f) of the "absence of anomaly" field as defined for a new tool per bore (Nb=1, Vb≈0), the influence of the front wear of the drill bit on the occurrence of a typical anomaly, is indicated following the following approach from the signal Fz(t), but could also be applied to signal C(t):

Step 1:
The wear in Vb of the drill bit is plotted as a function of the number of bores being drilled Nb for cutting conditions AL of the "absence of anomaly" field, in particular for the COM condition and an outside COM condition (FIG. 21).
From the above described curve, the critical number of bores $Nb_{crit}$ is deducted corresponding to the reject criterion of the drill bit ($Vb_{crit.}$=0.3 mm), for each cutting condition (Vc,f) under study. The $Nb_{crit.}$ Value of a given cutting condition then indicates the useful life of the drill bit.
The constant p is determined plotting values of Vb/Vbcrit. as a function of those of Nb/Nbcrit., and approximating them according to a power law of the type (FIG. 22):

$$\frac{Vb}{Vb_{crit}} = \left(\frac{Nb}{Nb_{crit.}}\right)^p$$

Step 2:
The typical anomaly under consideration is detected from destructive trials and the corresponding Vb is deduced, designated by Vb*. The relationship Vb as a function of Nb, allows to associate to a number of drilled bores Nb*, some tool wear Vb*, corresponding to the occurrence of the very first anomaly under consideration.
The master curve Vb*/$Vb_{crit.}$ is plotted for each of the cutting conditions as a function of Nb/Nb crit. (FIG. 23).

Step 3:
After each drilled bore $Fz_{moy}$ at the cutting edge inlet in the material (FIG. 24), and optionally, the surfaces of signals deduced from PM. The $Fz_{moy}$ increases as a function of Nb indicates a poor cutting quality, typical of an increasing front wear of the drill bit. On the other hand, the decrease of $Fz_{moy}$ between $t_1$ and $t_2$ results in a significant heating between the drill bit and the material advantageous for gluing chips and including, for the outside COM condition.

Step 4:
Parameter q is determined plotting values for $Fz_{moy}$(Nb)/$Fz_{moy}$(Nb=1) as a function of Nb for the different cutting conditions under study, and approximating them using a power law of the following type (FIG. 25):

$$\frac{Fz_{moy}(Nb)}{Fz_{moy}(Nb=1)} = Nb^q$$

According to the relationship as indicated in step 1, the number of bores NB could be expressed as:

$$Nb = Nb_{crit.}\left(\frac{Vb}{Vb_{crit.}}\right)^{1/p}.$$

Consequently, for a given tool/material assembly, $Fz_{moy}$(Nb)/$Fz_{moy}$(Nb=1) as a function of the standardized wear Vb/$Vb_{crit.}$ is expressed by the following relationship:

$$\frac{Fz_{moy}(Nb)}{Fz_{moy}(Nb=1)} = Nb_{crit.}^q \cdot \left(\frac{Vb}{Vb_{crit.}}\right)^{q/p}.$$

On the preceding curves (FIG. 26), the Vb*/$Vb_{crit.}$ is plotted corresponding to the occurrence of the considered anomaly for each cutting condition under study, and $Fz*_{moy}$(Nb*)/$Fz_{moy}$(Nb=1) is determined, constituting the wanted detection criterion. It has been found that such a criterion is independent from the cutting conditions and, for this reason, could be considered as intrinsic to the tool/material assembly under study.

As a consequence, any PM signature of a bore being drilled by means of a tool worn in Vb, for which $Fz_{moy}$(Nb)/$Fz_{moy}$(Nb=1)>$Fz*_{moy}$(Nb*)/$Fz_{moy}$(Nb=1) indicates the presence of the anomaly under consideration.

The same procedure could be implemented with the area analysis (see previous paragraph) for defining a detection criterion of a typical anomaly, as a result of a rake wear of the drill bit. In such a case, the anomaly surface under consideration is reported to that corresponding to the absence of anomaly as defined by the first bore.

Example of the Analysis of Signals Fz and C for the Coated WC-Co Tool/Inconel 718 TR Material Couple The above suggested procedure was followed for the coated WC-Co tool/Inconel 718 TR material assembly, with a view to defining the severity criteria of anomalies generated during the drilling operation.

A trial matrix and a drilling configuration were defined as follows:
Straight bore emerging with a continuous 15 mm downward movement of the drill bit (i.e. without any deburring cycle during the drilling operation) whatever the length to be drilled;
Boring with and without lubrication;
External lubrication by the mandril (pressure: 6 bars, flow rate: 22 l/min). The lubricant is made of a water/oil mixture, soluble at 6% in volume;
WC-Co cemented carbide monoblock tool from Sandvik of the [R415.5-0700-50-8C1] type comprising two cutting edges, two internal lubrication bores, a TiAlN coating, an angle δ of 140° at the top of the drill bit;
Maintain of the drill bit in the tool support using an ERφ7-8 precision clamping tool;
Inconel 718 TR material, with an ASTM 10 grain size, a quenched thermal treatment—double tempering 720° C./620° C., and a HRC43 macrohardness;
Link between the tool support and the spindle implemented by a HSK63 cone from Kennametal-Hertel;
A Huron KX10 machine tool provided with a three dimension stress measuring Kistler table (Fx, Fy, Fz);
Diameter of the drill bit: ranging from 5 to 10 mm;
Length to be drilled: ranging from 2,1 to 12 mm;
Cutting rate: ranging from 3 to 100 m/min;
Advance rate per round: ranging from 0,01 to 0.15 mm/round;
At least 2 bores are drilled per cutting condition with a new tool for each bore.

Signals Fz and C (FIGS. 27, 28, 29 and 30) were recorded using the acquisition chain as presented hereinabove. All three anomaly types are here present for the tool/material assembly under consideration. The PM signatures of each of said anomalies perfectly match those previously indicated.

The Typical Bore without any Anomaly

For the tool/material assembly under consideration and a Lp/D=8.5/7 ratio, the AL optimum drilling conditions as determined from the AFNOR NF E 66-520-8 method are as follows: Vc=8 m/min, f=0.08 mm/round. Such drilling conditions are characterized by (FIG. 27):
  A stationary rating in Fz ($Fz_{threshold}$=1800 N);
  A stationary rating in C ($C_{threshold}$=3.6 N.m);
  The $C_{max}/C_{threshold}$ and $Fz_{max}/Fz_{threshold}$ ratios equal to 1.

The Typical Bore with the CCI Anomaly (FIG. 28)

As opposed to the previous case, drilling occurs without any lubrication and is characterized by a slight ~5% decrease of Fzthreshold between $t_1$ and $t_2$. The $C_{max}/C_{threshold}$ ratio ranges from 1.2 to 2.5.

The Typical Bore with a CCI+BMC Anomaly Combination (FIG. 29)

It is characterized by a $C_{max}/C_{threshold}$ ratio ranging from 2.5 to 5, and occurs both for an AL drilling and for a SL drilling.

The Typical Bore with a CCI+BMC+ZATM Anomaly Combination (FIG. 30)

This typical bore is characterized by a $C_{max}/C_{threshold}$>5 ratio for a SL drilling, and a $Fz_{max}/Fz_{threshold}$ ratio much higher than 1, as opposed to both previous typical bores where $Fz_{max}/Fz_{threshold}$ was equal to 1. Such axial stress ratio indicates the damage to the drill bit. For Lp/D≧1.2 there is observed a triangular ZATM and for Lp/D≧1.2, there is observed a rectangular ZATM.

Severity Criterion of the ZATM from Fz (FIGS. 31, 32 and 33)

The 4-step procedure involving determining the formula giving the $ZATM_{max}$ as a function of cutting parameters and of geometrical parameters, was followed. Constants n, α, A, A' and B intrinsic to the coated WC-Co tool/Inconel 718TR material assembly are as follows:
  n=2.65
  α=0.46
  A=0.21 $s^{1.65} \cdot m^{-2.65}$
  A'=1.46.$10^{-7} s^{1.65} \cdot m^{-2.65}$
  B=320 $\mu m \cdot s^{-0.46}$ Severity Criterion of the ZATM from the Torque (FIG. 34)

For different cutting conditions and different bore geometries, the thickness of $ZATM_{max}$ is calculated by the above mentioned procedure. Constants F, λ and G intrinsic to the coated WC-Co tool/Inconel 718TR material assembly are as follows:

F=12.7 $\mu m \cdot J^{-0.53}$

G=365 $\mu m$

λ=0.53

Detection Criterion of a CCI+BMC Type Anomaly as a Result of the Tool Wear in Vb (FIGS. 35 to 43)

Destructive analyses of the bores showed the generation of two CCI and BMC typical anomalies with the drill bit wear in Vb in AL cutting conditions, considered as being little severe (Vc≦$Vc_{crit.}$). According to fatigue life duration tests, the combination of CCI+BMC type anomalies showed to be more critical than the CCI type anomaly only.

As a consequence, the 4-steps procedure involving establishing the detection criterion for the CCI+BMC type anomaly, as a result of a rake wear of the drill bit, was followed with the two following cutting conditions:

COM With lubrication Vc=8 m/min f=0.08 mm/–round

Outside COM With lubrication Vc=15 m/min f=0.02 mm/–round

The characteristic parameters of such a procedure are as follows:

| | COM | | Outside COM |
|---|---|---|---|
| $Nb_{crit.}$ = | 200 | $Nb_{crit.}$ = | 90 |
| Nb* = | 80 | Nb* = | 10 |
| P = | 0.675 | P = | 552 |
| | According to the Fz(t) signals: | | |
| $Fz_{moy}$ (Nb = 1) = | 1800 N | $Fz_{moy}$ (Nb = 1) = | 1020 N |
| q = | 0.046 | q = | 0.139 |
| | According to the C(t) signals: | | |
| $C_{moy}$ (Nb = 1) = | 3.6 N · m | $C_{moy}$ (Nb = 1) = | 1.4 N · m |
| q = | 0.058 | q = | 0.136 |

The detection criteria for the anomaly combination of CCI+BMC type under consideration as a result of some wear in Vb, intrinsic to the WC-Co coated tool/Inconel 718 TR material assembly and independent from the selected cutting conditions are as follows:

$FZ*_{moy}$(Nb*)/$Fz_{moy}$(Nb=1)=1.25, i.e a 25% increase of the average axial stress as compared to that measured at the first bore with a new tool;

$C*_{moy}$(Nb*)/$C_{moy}$(Nb=1)=1.23, i.e. a 23% increase of the mean torque as compared to that measured at the first bore with a new tool.

0000

The table hereunder lists the definition of all the symbols mentioned herein, as well as the mathematical relationships allowing for the values thereof to be calculated.

| Symbols | Designation | Relationships | Units |
|---|---|---|---|
| α | Constant intrinsic to the tool/material assembly, involved in the severity criterion as defined by the thickness of $ZATM_{max}$ from the Fz stress | — | — |

-continued

| Symbols | Designation | Relationships | Units |
|---|---|---|---|
| δ | Tip angle or top angle of the drill bit | — | ° |
| λ | Constant intrinsic to the tool/material assembly, involved in the severity criterion as defined by the thickness of $ZATM_{max}$ from the torque | — | — |
| ω | Angular speed | $\dfrac{\pi \cdot N}{30}$ | $rd \cdot s^{-1}$ |
| β' | Angle of the streaks left by the drill bit (noses, lists), compared to an axis perpendicular to the bore when the drill bit goes up | Arctan (−Vr/Vc) | ° |
| A | Constant intrinsic to the tool/material assembly, involved in the severity criterion as defined by the thickness of $ZATM_{max}$ from the Fz stress | $60^n \cdot E \cdot Vc^{-n}$ | $s^{n-1} \cdot m^{-n}$ |
| A' | Constant intrinsic to the tool/material assembly, involved in the severity criterion as defined by the thickness of $ZATM_{max}$ from the Fz stress | $A \cdot (10^{-6} \cdot 60^{2-n} \cdot \pi^2)$ | $s^{n-1} \cdot m^{-n}$ |
| $AreaFz_{max}$<br>$AreaC_{max}$ | Area under the curves Fz(t) or C(t) having as a lower boundary $Fz_{threshold}$ or $C_{threshold}$ and as a upper boundary $Fz_{max}$ or $C_{max}$ corresponding to the presence of anomalies | $\int_{t0}^{t4} Fz(t)dt - Area_{Fzthreshold}$ | $N \cdot s$,<br>$N \cdot m \cdot s$ |
| $AreaFz_{threshold}$<br>$AreaC_{threshold}$ | Area under the curves Fz(t) or C(t) having as an upper boundary $Fz_{threshold}$ or $C_{threshold}$ corresponding to the absence of anomaly | $\int_{t0}^{t4} (Fz(t) \leq Fz_{threshold})dt$ | $N \cdot s$,<br>$N \cdot m \cdot s$ |
| $AreaFz_{moy}(Nb)$<br>$AreaC_{moy}(Nb)$ | Area under the curves Fz(t) or C(t) after a Nb of drilled bores, corresponding to some tool wear with or without the presence of anomaly(s) | $\int_{t0}^{t4} Fz_{Nb}(t)dt$ | $N \cdot s$,<br>$N \cdot m \cdot s$ |
| $AreaFz_{moy}(Nb=1)$<br>$AreaC_{moy}(Nb=1)$ | Area under the curves Fz(t) or C(t) corresponding to the absence of anomaly and tool wear | $\int_{t0}^{t4} Fz_{Nb=1}(t)dt$ | $N \cdot s$,<br>$N \cdot m \cdot s$ |
| AL | Drilling with lubrication | — | — |
| B | Constant intrinsic to the tool/material assembly, involved in the severity criterion as defined by the thickness of $ZATM_{max}$ from the Fz stress | — | µm/s |
| BDP or DP | Plastic deformation strip | — | — |
| BMC or MC | Sheared material strip | — | — |

-continued

| Symbols | Designation | Relationships | Units |
|---|---|---|---|
| C | Torque as generated by the drill bit on the part during the drilling phase (linear combination of transversal stresses Fx and Fy) | At a point M of the stress measuring table, as defined by the coordinates thereof, x and y: $C = C_0 + x \cdot Fy - y \cdot Fx$ where $C_0$ is the torque value at the point (x=0 and y=0). | N · m |
| $C^*_{Fz}$ | Torque corresponding to the stress increasing time $t^*_{Fz}$ | — | N · m |
| $C^*_{moy(Nb^*)}$ | $C_{moy}$ for a Vb* wear corresponding to the occurrence of the anomaly under consideration | — | N · m |
| CCI or CI | Gluing of isolated chips | — | — |
| $C_{max}$ | Maximum torque | — | N · m |
| $C_{moy}$ | Average torque at the inlet of cutting edges into the material | — | N · m |
| $C_{moy(Nb)}$ | $C_{moy}$ corresponding to a given Vb wear | — | N · m |
| $C_{moy(Nb=1)}$ | $C_{moy}$ corresponding to the first bore to be drilled (Nb = 1) implemented from a new tool | — | N |
| CND | Non destructive control | — | — |
| COM | Tool-material assembly | — | — |
| $C_{threshold}$ | Stationary torque | — | N · m |
| d | Diameter of the drill bit | — | mm |
| E | Straight lien slope $FZ_{max}/FZ_{threshold}$ as a function of tp | $A \cdot 60^{-n} \cdot V^n_c$ | $s^{-1}$ |
| $Ec_{max}$ | Maximum cutting energy | $\dfrac{10^{-3} \cdot C_{max} \cdot V_c}{30 \cdot D} \cdot tp$ | J |
| F | Constant intrinsic to the tool/material assembly, involved in the severity criterion as defined by the thickness of $ZATM_{max}$ from the torque | — | $\mu m \cdot J^{-\lambda}$ |
| f | Advance per round | — | mm/round |
| Fx and Fy | Transversal stresses generated at a point of the edge by the material | — | N |
| Fz | Axial stress or penetration stress of the drill bit into the material | — | N |
| $Fz^*_{moy(Nb^*)}$ | $C_{moy}$ for a Vb* wear corresponding to the occurrence of the anomaly under consideration | — | |
| $Fz_{max}$ | Maximum axial stress | — | N |
| $Fz_{moy}$ | Average axial stress at the inlet of cutting edges into the material | — | N |
| $Fz_{moy(Nb)}$ | $C_{moy}$ corresponding to a given Vb wear | — | |

-continued

| Symbols | Designation | Relationships | Units |
|---|---|---|---|
| $Fz_{moy}$ (Nb = 1) | $C_{moy}$ corresponding to the first bore to be drilled (Nb = 1) implemented from a new tool | — | |
| $Fz_{threshold}$ | Stationary axial stress | — | N |
| G | Constant intrinsic to the tool/material assembly, involved in the severity criterion as defined by the thickness of $ZATM_{max}$ from the torque | — | mm |
| tip h | Tool tip height | $\dfrac{D}{2} \cdot \cot an \dfrac{\delta}{2}$ | mm |
| Kca | Cutting specific stress associated to the axial stress | $\dfrac{2 \cdot Fz}{f \cdot D}$ | N/mm² |
| Kct | Specific cutting stress associated to the torque | $\dfrac{8000 \cdot C}{f \cdot D^2}$ | N/mm² |
| Lb | Burr length at the bore outlet | $\dfrac{10^3 \cdot V_c \cdot f}{60 \cdot \pi \cdot D} \cdot (t^*_{Fz=0} - t^*_3)$ | mm |
| Ld | Deburring length | — | mm |
| Lp | Length to be drilled | — | mm |
| Lt | Total length of the downward tool shift | — | mm |
| MEB | Scanning electronic microscope | — | — |
| MO | Optical microscope | — | — |
| n | Constant intrinsic to the tool/material assembly, involved in the severity criterion as defined by the thickness of $ZATM_{max}$ from the Fz stress | — | — |
| N | Spindle rotation speed | $\dfrac{10^3 \cdot V_c}{\pi \cdot D}$ | rounds/min |
| Nb | Number of bores drilled with the same tool | — | — |
| Nb* | Number of bores drilled with the same tool corresponding to the occurrence of the anomaly under consideration | — | — |
| $Nb_{crit.}$ | Critical number of drilled bores corresponding to Vb = 0.3 mm (rejection of the drill bit) | — | — |
| P | Constant depending on a cutting condition and involved in the detection criterion of a anomaly associated to the wear Vb | — | — |
| $Pc_{max}$ | Maximum power dissipated during the cutting operation | $\dfrac{10^{-3} \cdot C_{max} \cdot V_c}{30 \cdot D}$ | W or J·s⁻¹ |

-continued

| Symbols | Designation | Relationships | Units |
|---|---|---|---|
| PM | Process Monitoring | — | — |
| q | Constant depending on a cutting condition, deduced from Fz(t) or from C(t) and involved in the detection criterion of a anomaly associated to the wear Vb | — | — |
| R = Lp/D | Ratio = length to be drilled/diameter | — | — |
| SL | Drilling without any lubrication | — | — |
| T. | Efficient cutting time for one single tool and several bores being drilled | Nb · tp | s |
| t* | Efficient cutting time for one single tool corresponding to the occurrence of the anomaly under consideration | Nb* · tp | s |
| $t^*_3$ | Experimental time from which the cutting edges (drill bit noses) emerge from the material | — | s |
| $t^*_{Fz}$ | Transient time between the stationary rate and the stress increase | — | s |
| $t^*_{Fz=0}$ | Time after which the stress returns to zero a little before the drill bit goes up | — | s |
| $t_0$ | Theoretical time from which the drill bit tip penetrates into the material | — | s |
| $t_1$ | Theoretical time from which the cutting edges (drill bit noses) penetrate into the material | — | s |
| $t_2$ | Theoretical time from which the drill bit tip emerges from the material | — | s |
| $t_3$ | Theoretical time from which the cutting edges (drill bit noses) emerge from the material | — | s |
| $t_4$ | Time just before the drill bit goes up | — | s |
| $t_c^*$ | Transient time between the stationary rate and the torque increase | — | s |
| $t_{crit.}$ | Critical cutting time corresponding to Vb = 0.3 mm (rejection of the drill bit) | $Nb_{crit.} \cdot tp$ | s |
| td | Deburring time of the drill bit | $\dfrac{60 \cdot \pi \cdot Ld \cdot D}{10^3 \cdot V_c \cdot f}$ | s |
| tp | Drilling time | $\dfrac{60 \cdot \pi \cdot Lp \cdot D}{10^3 \cdot V_c \cdot f}$ | s |
| tt | Total going down time of the tool | $\dfrac{60 \cdot \pi \cdot Lt \cdot D}{10^3 \cdot V_c \cdot f}$ | s |

-continued

| Symbols | Designation | Relationships | Units |
|---|---|---|---|
| Vb | Cutting edge front wear | — | mm |
| Vb* | Cutting edge wear corresponding to the occurrence of the anomaly under consideration | — | mm |
| $Vb_{crit.}$ | Rejection critical front wear of the drill bit evaluated at 0.3 mm | — | mm |
| Vc | Cutting rate | $\dfrac{\pi \cdot D \cdot N}{10^3}$ | m/min |
| $Vc_{crit.}$ | Critical cutting rate separating the "anomalyless" field from the "anomaly" one | — | m/min |
| Vf | Advance per minute or progression rate | $N \cdot f$ | mm/min |
| Vr | Axial going up rate of the drill bit | — | m/min |
| ZATM | Thermo-mechanically affected area | — | — |
| $ZATM_{max}$ | Maximum thickness of the thermo-mechanically affected area at the bore outlet | $B \cdot (A' \cdot V_c^{n-2} \cdot L_p^2 \cdot D^2 \cdot f^{-2})^{\alpha}$ or $F \cdot \left(\dfrac{10^3 \cdot C_{max} \cdot V_c}{30 \cdot D} \cdot tp\right)^{\lambda} - G$ | μm |
| ZATMr | Rectangular ZATM | — | — |
| ZATMt | Triangular ZATM | — | — |
| ZR | Recrystallized area | — | — |

The invention claimed is:

1. A method for detecting and optionally quantifying drilling anomalies in a metal part, a drilling operation having been performed on said metal part by a drill bit, wherein said method comprises determining on the one hand a value set of at least one of the two following parameters, depending on the penetration axial stress of the drill bit into the metal part Fz(t) and the torque C(t), generated during at least one part of the drilling operation, followed by isolating the $Fz_{threshold}$ and $C_{threshold}$ values corresponding to a threshold and representative of the absence of any anomaly, the $Fz_{max}$ and $C_{max}$ values corresponding to the maximum values and being representative of the presence of an anomaly, and then determining at least the $Fz_{max}/Fz_{threshold}$ and $C_{max}/C_{threshold}$ ratios or the $Area_{Fzmax}/Area_{Fzthreshold}$ or $Area_{Cmax}/Area_{Cthreshold}$ area ratios that are the areas under the Fz(t) or C(t) curves having as a lower boundary $Fz_{threshold}$ or $C_{threshold}$ and as a higher boundary $Fz_{max}$ or $C_{max}$ related to the areas under the Fz(t) or C(t) curves having as a higher boundary $Fz_{threshold}$ or $C_{threshold}$, so as indicate the anomaly type and optionally its severity.

2. A method according to claim 1 further comprising isolating the values $Fz_{moy}(Nb)$ and $C_{moy}(Nb)$ as a function of the number of bores being drilled and corresponding to the mean values of signals at the inlet of cutting edges in the material and followed by determining at least the $Fz_{moy}(Nb)/Fz_{moy}(Nb=1)$ or $C_{moy}(Nb)/-C_{moy}(Nb=1)$ ratios, and further isolating a set of values associated to the rake wear Vb of the drill bit such as $Nb_{crit.}$ corresponding to the critical number of bores being drilled according to which Vb=0.3 mm (rejection of the drill bit), Vb* and Nb* corresponding to the first occurrence of the anomaly under consideration, so as to indicate the occurrence of a anomaly associated to wear.

3. A method according to claim 1, wherein a CCI type anomaly is determined from the variation range of the $[C_{max}/C_{threshold}]_{CCI}>1$ ratio and a $[Fz_{max}/Fz_{threshold}]_{CCI}=1$ ratio.

4. A method according to claim 1, wherein a CCI and BMC combined type anomaly is determined from the variation range of the $[C_{max}/C_{threshold}]_{CCI+BMC}>-[C_{max}/C_{threshold}]_{CCI}>1$ ratio and a $[Fz_{max}/Fz_{threshold}]_{CCI+BMC}=1$ ratio.

5. A method according to claim 1, wherein a CCI, BMC and ZATM combined type anomaly is determined from the variation range of the $[C_{max}/C_{threshold}]_{CCI+BMC+ZATM}>-(C_{max}/C_{threshold})_{CCI+BMC}>1$ ration and a $[Fz_{max}/Fz_{threshold}]_{CCI+BMC+ZATM}>1$ ratio.

6. A method according to claim 5, wherein the $Fz_{max}/Fz_{threshold}$ ratio is plotted as a function of the measured or calculated drilling time tp and having its slope E being expressed as $E=A.60^{-n}.V_c^{n}$.

7. A method according to claim 6, wherein the constants A and n are determined plotting the slope E of the previous straight line as a function of $$\frac{Fz_{threshold}}{Fz_{threshold}} = E \cdot tp$$

Vc on a logarithmic scale, i.e. $\ln E = n.\ln V_c + \ln(A.60^{-n})$.

8. A method according to claim 7, wherein the constants B and α are determined plotting the experimental values of the $ZATM_{max}$ as a function of the product $$\frac{Fz_{max}}{Fz_{threshold}} \cdot tp,$$

said experimental values being expressed as $$ZATM_{max} = B \cdot \left(\frac{Fz_{max}}{Fz_{threshold}} \cdot tp\right)^{\alpha}.$$

9. A method according to claim 8, wherein a severity criterion is determined based on the thickness of the $ZATM_{max}$ as a function of geometric parameters (Lp, D) and of cutting parameters (Vc, f) being expressed as:
$ZATM_{max} = B \cdot (A^1 \cdot V_c^{n-2} \cdot L_p^2 \cdot D^2 \cdot f^{-2})^{\alpha}$
  b. with $A' = A \cdot (10^{-} \cdot 60^{2-n} \pi^2)$, and constants A, α, B and n being intrinsic to the tool/material assembly.

10. A method according to claim 1, wherein four constants A, α, B and n are determined, being intrinsic to a tool/material assembly used with the method.

11. A method according to claim 5, wherein a severity criterion is determined from the torque, involving expressing the experimental values of the $ZATM_{max}$ as a function of the maximum energy $EC_{max}$ dissipated during the cutting operation deduced from the max $C_{max\ torque}$, from Vc, from D and from the calculated or the measured drilling time tp, being expressed as:

a. $ZATM_{max} = F \cdot \left(\frac{10^3 \cdot C_{max} \cdot V_c}{30 \cdot D} \cdot tp\right)^{\lambda} - G$ b. with $Ec_{max} = \frac{10^3 \cdot C_{max} \cdot V_c}{30 \cdot D} \cdot tp,$ and constants λ, F and G being intrinsic to the tool/material assembly under consideration.

12. A method according to claim 1, wherein the areas are calculated under the Fz(t) and C(t) curves, when signals Fz and C of any anomaly do not show any threshold value or maximum value and when the $C_{max}/C_{threshold}$ or $Fz_{max}/Fz_{threshold}$ ratios are identical for two identical typical bores showing different anomaly severities.

13. A method according to claim 12, wherein the $Area_{Fzmax}/Area_{Fzthreshold}$ or $Area_{Cmax}/Area_{Cthreshold}$ area ratios are calculated for quantifying the anomaly severity.

14. A method according to claim 2, wherein a CCI+BMC type anomaly is detected, associated to the wear in Vb of the drill bit in the case of a drilling operation with lubrication, wherein the parameter p is determined plotting the values for $Vb/Vb_{crit.}$ as a function of the values of $Nb/Nb_{crit.}$, and approximating them according to a power law of the type:

$$\frac{Vb}{Vb_{crit.}} = \left(\frac{Nb}{Nb_{crit.}}\right)^p.$$

15. A method according to claim 14, wherein for each of the cutting conditions under study, the master curve $Vb^*/Vb_{crit.}$ is plotted as a function of $Nb/Nb_{crit.}$.

16. A method according to claim 2, wherein the parameter q is determined plotting values for $Fz_{moy}(Nb)/Fz_{moy}(Nb=1)$ as a function of Nb for the different cutting conditions under study, and approximating them using a power law of the following type:

$$\frac{Fz_{moy}(Nb)}{Fz_{moy}(Nb=1)} = Nb^q.$$

17. A method according to claim 2, wherein for a given tool/material assembly, $Fz_{moy}(Nb)/Fz_{moy}(Nb=1)$ is expressed as a function of the standard wear $Vb/Vb_{crit.}$ using the following relationship:

$$\frac{Fz_{moy}(Nb)}{Fz_{moy}(Nb=1)} = Nb_{crit.}^q \cdot \left(\frac{Vb}{Vb_{crit.}}\right)^{q/p}.$$

18. A method according to claim 15, wherein on an equation curve for each cutting condition $$\frac{Fz_{moy}(Nb)}{Fz_{moy}(Nb=1)} = Nb_{crit.}^q \cdot \left(\frac{Vb}{Vb_{crit.}}\right)^{q/p},$$

the $Vb^*/Vb_{crit.}$ values corresponding to the occurrence of the anomaly under consideration of the CCI+BMC type are plotted and $Fz^*_{moy}(Nb^*)/Fz_{moy}(Nb=1)$ thereof is determined, being the detection criterion of the CCI+BMC type anomaly, independent from the cutting conditions and intrinsic to the tool/material assembly under consideration and for which $Fz_{moy}(Nb)/Fz_{moy}(Nb=1) > Fz^*_{moy}(Nb^*)/Fz_{moy}(Nb=1)$ indicates the presence of the anomaly under consideration.

19. A method according to claim 2, wherein the area analysis is used for defining a detection criterion of a typical anomaly, as a result of a rake wear of the drill bit, where the surface of the anomaly under consideration is reported to that corresponding to the absence of any anomaly defined by the first bore.

20. A device for implementing the method according to claim 1, comprising a means for representing and treating transversal stresses Fx, Fy and an axial stress Fz as a function of the time between $t_0$ and $t_4$, a means for storing data representative of signals for the detection and the quantification of anomalies and a means for representing and treating such data as well as those associated to the rake wear of the drill bit.

* * * * *